US010437990B2

(12) United States Patent
Bulygin et al.

(10) Patent No.: US 10,437,990 B2
(45) Date of Patent: Oct. 8, 2019

(54) DETECTION OF RETURN ORIENTED PROGRAMMING ATTACKS IN A PROCESSOR

(71) Applicant: McAfee, Inc., Santa Clara, CA (US)

(72) Inventors: Yuriy Bulygin, Beaverton, OR (US); Gideon Gerzon, Zichron Yaakov (IL); Sameer Desai, Folsom, CA (US); Hisham Shafi, Akko (IL); Andrew A. Furtak, Beaverton, OR (US); Oleksandr Bazhaniuk, Hillsboro, OR (US); Mikhail V. Gorobets, Hillsboro, OR (US); Ravi L. Sahita, Beaverton, OR (US); Ofer Levy, Atlit (IL)

(73) Assignee: McAfee, LLC, Santa Clara, CA (US)

( * ) Notice: Subject to any disclaimer, the term of this patent is extended or adjusted under 35 U.S.C. 154(b) by 131 days.

(21) Appl. No.: 15/281,384

(22) Filed: Sep. 30, 2016

(65) Prior Publication Data

US 2018/0096140 A1    Apr. 5, 2018

(51) Int. Cl.
*G06F 12/14* (2006.01)
*G06F 21/55* (2013.01)
(Continued)

(52) U.S. Cl.
CPC .......... *G06F 21/552* (2013.01); *G06F 9/4486* (2018.02); *G06F 21/52* (2013.01);
(Continued)

(58) Field of Classification Search
CPC . H04L 63/1416; G06F 9/30163; G06F 9/321; G06F 21/563; G06F 21/552
(Continued)

(56) References Cited

U.S. PATENT DOCUMENTS 5,944,821 A    8/1999    Angelo
5,968,169 A    10/1999   Pickett
(Continued)

FOREIGN PATENT DOCUMENTS

| CN | 102663312 | 9/2012 |
| EP | 2867843 | 5/2015 |
| WO | 2014005067 | 1/2014 |

OTHER PUBLICATIONS

Huang et al, A Dynamic Detective Method Against ROP Attack on ARM Platform, IEEE, Jun. 9, 2012, pp. 51-57.*
(Continued)

*Primary Examiner* — Luu T Pham
*Assistant Examiner* — Jenise E Jackson
(74) *Attorney, Agent, or Firm* — Hanley, Flight & Zimmerman, LLC

(57) ABSTRACT

In an embodiment, a processor for Return Oriented Programming (ROP) detection includes at least one execution unit; a plurality of event counters, each event counter associated with a unique type of a plurality of types of control transfer events; and a ROP detection unit. The ROP detection unit may be to: adjust a first event counter in response to detection of a first type of control transfer events; in response to a determination that the first event counter exceeds a first threshold, access a first configuration register associated with the first event counter to read configuration data; identify a set of ROP heuristic checks based on the configuration data read from the first configuration register; and perform each ROP heuristic check of the identified set of ROP heuristic checks. Other embodiments are described and claimed.

15 Claims, 21 Drawing Sheets

(51) Int. Cl.
| | |
|---|---|
| *G06F 21/56* | (2013.01) |
| *G06F 21/52* | (2013.01) |
| *G06F 21/57* | (2013.01) |
| *G06F 21/71* | (2013.01) |
| *G06F 21/81* | (2013.01) |
| *G06F 9/448* | (2018.01) |

(52) U.S. Cl.
CPC .............. *G06F 21/56* (2013.01); *G06F 21/57* (2013.01); *G06F 21/71* (2013.01); *G06F 21/81* (2013.01); *G06F 2221/033* (2013.01); *G06F 2221/034* (2013.01); *G06F 2221/2101* (2013.01)

(58) Field of Classification Search
USPC .......................................................... 726/23
See application file for complete search history.

(56) References Cited

U.S. PATENT DOCUMENTS

| | | | |
|---|---|---|---|
| 6,578,094 B1 | 6/2003 | Moudgill | |
| 6,802,006 B1 | 10/2004 | Bodrov | |
| 6,941,473 B2 | 9/2005 | Etoh et al. | |
| 7,272,748 B1 | 9/2007 | Conover et al. | |
| 7,287,283 B1 | 10/2007 | Szor | |
| 7,581,089 B1 | 8/2009 | White | |
| 7,594,111 B2 | 9/2009 | Kiriansky et al. | |
| 7,631,249 B2 | 12/2009 | Borde | |
| 8,555,077 B2 | 10/2013 | Davis et al. | |
| 8,566,944 B2 | 10/2013 | Peinado et al. | |
| 8,688,980 B2 | 4/2014 | Davis et al. | |
| 8,689,350 B2 | 4/2014 | Davis et al. | |
| 8,713,704 B2 | 4/2014 | Davis et al. | |
| 8,813,085 B2 | 8/2014 | Glew et al. | |
| 8,869,241 B2 | 10/2014 | Davis et al. | |
| 8,930,714 B2 | 1/2015 | Glew et al. | |
| 8,943,313 B2 | 1/2015 | Glew et al. | |
| 8,955,111 B2 | 2/2015 | Glew et al. | |
| 9,015,860 B2 | 4/2015 | Davis et al. | |
| 9,083,687 B2 | 7/2015 | Davis et al. | |
| 9,098,608 B2 | 8/2015 | Glew et al. | |
| 9,170,843 B2 | 10/2015 | Glew et al. | |
| 9,223,979 B2 | 12/2015 | Fischer | |
| 9,251,348 B2 | 2/2016 | Fischer | |
| 9,298,900 B2 | 3/2016 | Davis et al. | |
| 9,348,985 B2 | 5/2016 | Davis et al. | |
| 9,443,085 B2 | 9/2016 | Davis et al. | |
| 9,582,663 B2 | 2/2017 | Fischer et al. | |
| 2001/0044904 A1 | 11/2001 | Berg et al. | |
| 2002/0144141 A1 | 10/2002 | Edwards et al. | |
| 2003/0145226 A1 | 7/2003 | Bruton, III et al. | |
| 2005/0022020 A1 | 1/2005 | Fremberg | |
| 2007/0180524 A1 | 8/2007 | Choi et al. | |
| 2008/0015808 A1 | 1/2008 | Wilson et al. | |
| 2008/0016314 A1 | 1/2008 | Li et al. | |
| 2008/0060077 A1 | 3/2008 | Cowan et al. | |
| 2008/0216175 A1 | 9/2008 | Pike | |
| 2009/0144309 A1 | 6/2009 | Cabrera Escandell et al. | |
| 2010/0122088 A1 | 5/2010 | Oxford | |
| 2010/0175132 A1 | 7/2010 | Zawadowskiy et al. | |
| 2011/0145921 A1 | 6/2011 | Mathur et al. | |
| 2011/0277035 A1 | 11/2011 | Singh et al. | |
| 2012/0030758 A1 | 2/2012 | van den Berg et al. | |
| 2012/0167120 A1 | 6/2012 | Hentunen | |
| 2012/0297485 A1 | 11/2012 | Maeda et al. | |
| 2013/0014221 A1 | 1/2013 | Moore et al. | |
| 2013/0024676 A1 | 1/2013 | Glew et al. | |
| 2013/0024867 A1 | 1/2013 | Glew et al. | |
| 2013/0024939 A1 | 1/2013 | Glew et al. | |
| 2013/0036314 A1 | 1/2013 | Glew et al. | |
| 2013/0036464 A1 | 2/2013 | Glew et al. | |
| 2013/0081043 A1 | 3/2013 | Glew et al. | |
| 2013/0117843 A1 | 5/2013 | Komaromy et al. | |
| 2013/0133054 A1 | 5/2013 | Davis et al. | |
| 2013/0151515 A1 | 6/2013 | Davis et al. | |
| 2013/0151617 A1 | 6/2013 | Davis et al. | |
| 2013/0159217 A1 | 6/2013 | Davis et al. | |
| 2013/0159413 A1 | 6/2013 | Davis et al. | |
| 2013/0160087 A1 | 6/2013 | Davis et al. | |
| 2013/0185792 A1 | 7/2013 | Balakrishnan et al. | |
| 2013/0191887 A1 | 7/2013 | Davis et al. | |
| 2013/0197968 A1 | 8/2013 | Davis et al. | |
| 2014/0020092 A1 | 1/2014 | Davidov | |
| 2014/0075556 A1 | 3/2014 | Wicherski | |
| 2014/0096245 A1 | 4/2014 | Fischer | |
| 2014/0096247 A1 | 4/2014 | Fischer | |
| 2014/0123249 A1 | 5/2014 | Davis et al. | |
| 2014/0123281 A1 | 5/2014 | Fischer et al. | |
| 2014/0123286 A1 | 5/2014 | Fischer et al. | |
| 2014/0380474 A1 | 12/2014 | Paithane et al. | |
| 2015/0020075 A1 | 1/2015 | Glew et al. | |
| 2015/0113640 A1 | 4/2015 | Krten et al. | |
| 2015/0128262 A1 | 5/2015 | Glew et al. | |
| 2015/0128266 A1 | 5/2015 | Tosa | |
| 2015/0339480 A1* | 11/2015 | Lutas ...................... G06F 21/56 726/22 |
| 2015/0371039 A1* | 12/2015 | Suominen ............... G06F 21/52 726/23 |
| 2016/0012229 A1 | 1/2016 | Fischer | |
| 2016/0085966 A1 | 3/2016 | Fischer et al. | |
| 2016/0092673 A1* | 3/2016 | LeMay ................... G06F 21/56 718/1 |
| 2016/0196428 A1* | 7/2016 | Momot ................... G06F 21/54 726/23 |
| 2017/0017791 A1 | 1/2017 | Brandt et al. | |
| 2017/0116414 A1 | 4/2017 | Fischer et al. | |

OTHER PUBLICATIONS

Qiao et al, A Principled Approach for ROP Defense, ACM, Dec. 11, 2015, pp. 101-110.*

Cowan, et al., "Stackguard: Automatic Adaptive Detection and Prevention of Buffer-Overflow Attacks," 7th USENIX Security Symposium, Jan. 26-29, 1998, pp. 1-15.

Davi, et al., "ROPdefender: A Detection Tool to Defend Against Return-Oriented Programming Attacks," Mar. 2011, ASIACCA 2011, pp. 40-51.

Lu, et al., "deRop: Removing Return-Oriented Programming from Malware," Dec. 2011, ACSAC 2011, pp. 363-372.

Shacham, "The Geometry of Innocent Flesh on the Bone: Return-into-libc without Function Calls (on the x86)," Nov. 2007, CCS 2007, pp. 552-561.

Checkoway, et al., "Return-Oriented Programming without Returns" Oct. 2010, CCS 2010, pp. 559-572.

Pappas, "kBouncer: Efficient and Transparent ROP Mitigation," Apr. 1, 2012, retrieved from http://www.cs.columbia.edu/~vpappas/papers/kbouncer.pdf See pp. 1-3, 5-6.

Zovi, "Return-Oriented Exploitation" Presentation at Black Hat USA 2010 Briefings, Jul. 2010, 91 pages.

Yuan, et al., "Security Breaches as PMU Deviation: Detecting and Identifying Security Attacks Using Performance Counters," In: Proceedings of the Second Asia-Pacific Workshop on Systems, Shanghai, China, Jul. 11-12, 2011, Article No. 6 See pp. 1-3, 5.

Roemer, et al., "Return-Oriented Programming: Systems, Languages, and Applications", University of California, San Diego; ACM Transactions on Information and System Security (TISSEC), Mar. 2012, 42 pages.

Buchanan, et al., "When Good Instructions Go Bad: Generalizing Return-Oriented Programming to RISC", In: Proceedings of the 15th ACM Conference on Computer and Communications Security 2008, ACM Press, Alexandria, Virginia, USA, Oct. 27-31, 2008, pp. 28-38.

Buchanan, et al.,"Return-Oriented Programming: Exploitation Without Code Injection", University of California, San Diego; Presentation at Black Hat USA 2008 Briefings, Aug. 2008, 53 pages.

The International Search Report and the Written Opinion of the International Searching Authority, dated Nov. 28, 2017, 11 pages.

(56) References Cited

OTHER PUBLICATIONS

International Bureau, "International Preliminary Report on Patentability," mailed in connection with International Patent Application No. PCT/US2017/054488, dated Apr. 2, 2019, 7 pages.

* cited by examiner

DETECTION OF RETURN ORIENTED PROGRAMMING ATTACKS IN A PROCESSOR

CROSS REFERENCE TO RELATED APPLICATION

This application is related to U.S. patent application Ser. No. 14/960,709 filed Dec. 7, 2015, and U.S. patent application Ser. No. 13/799,663 filed Mar. 13, 2013, which are continuations of U.S. patent application Ser. No. 13/664,532, filed Oct. 31, 2012. The content of these related patent applications is hereby incorporated by reference.

BACKGROUND

Embodiments relate generally to computer security.

Computer exploits are techniques which may be used to compromise the security of a computer system or data. Such exploits may take advantage of a vulnerability of a computer system in order to cause unintended or unanticipated behavior to occur on the computer system. For example, Return Oriented Programming (ROP) exploits may involve identifying a series of snippets of code that are already available in executable memory (e.g., portions of existing library code), and which are followed by a return instruction (e.g., a RET instruction). Such snippets may be chained together into a desired execution sequence by pushing a series of pointer values onto the call stack and then tricking the code into execution the first pointer value. This chained execution sequence does not follow the intended program execution order that the original program author intended, but may instead follow an alternative execution sequence. In this manner, an attacker may create a virtual program sequence without requiring injection of external code.

DETAILED DESCRIPTION

In accordance with some embodiments, detection of runtime exploits such as Return Oriented Programming (ROP) exploits may be provided. In one or more embodiments, a set of event counters may count control transfer events occurring during execution. When an event counter reaches a threshold value, detection logic in a microprocessor may perform additional analysis prior to signaling an interrupt to security application. For example, detection logic within the microprocessor may perform additional analysis by accessing configuration registers associated with the event counter to read configuration data for the event counter. The configuration data may be used to identify a set of heuristic checks to detect specific characteristics of runtime exploits, for example stack pivoting commonly used by ROP type of runtime exploits. A possible runtime exploit may be identified based on results of performing the set of heuristic checks. An indication of the possible runtime exploit may be provided to a security application for further analysis. Some examples of heuristic checks may include checking whether the stack pointer is within the correct boundaries of stack segments defined for monitored applications, whether an instruction pointer is within correct boundaries of executable segments of monitored applications, whether an instruction pointer is within the prohibited ranges (such as stack or data heap), whether an instruction pointer is in the list of API functions commonly invoked by runtime exploits, whether a stack frame pointer is within a certain distance of the stack pointer, and/or whether a target address of the last indirect branch instruction is an allowed target of a control transfer.

Figure 1A:
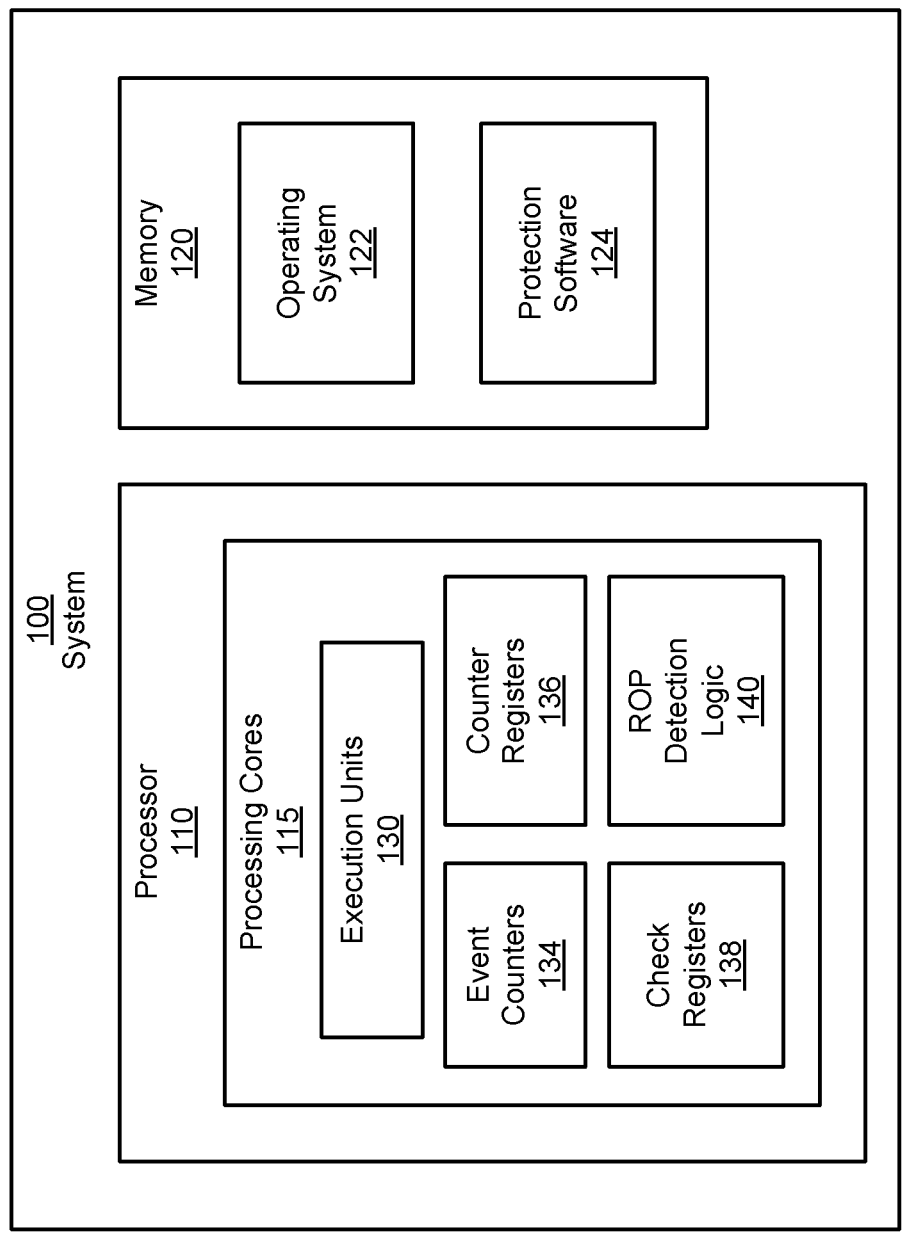
FIG. 1A is a block diagram of a system in accordance with one or more embodiments.

Referring to FIG. 1A, shown is a block diagram of a system 100 in accordance with one or more embodiments. As shown in FIG. 1A, the system 100 may include a processor 110 and a memory 120. In accordance with some embodiments, the system 100 may be all or a portion of any electronic device, such as a cellular telephone, a computer, a server, a media player, a network device, etc.

In accordance with some embodiments, the memory 120 may include an operating system (OS) 122 and protection software 124. In some embodiments, the OS 122 and/or the protection software 124 may include functionality to protect the system 100 against computer exploits and attacks. For example, the protection software 124 may be an anti-malware application, an intrusion detector, a network firewall, etc.

The processor 110 may be a general purpose hardware processor (e.g., a central processing unit (CPU)). As shown, the processor 110 can include any number of processing cores 115. Each processing core 115 may be a general purpose processing core. In one or more embodiments, each processing core 115 may include one or more execution units 130, event counters 134, counter registers 136, check registers 138, and ROP detection logic 140. In some embodiments, the execution units 130 may execute instructions as part of processing performed by the core 115 and/or processor 110.

In some embodiments, the ROP detection logic 140 may adjust the event counters 134 may be adjusted based on control transfer events in the core 115. Each event counter 134 may be associated with a particular type of control transfer event. Further, each event counter 134 may be uniquely associated with a counter register 136. In some embodiments, each counter register 136 may store configuration data for an associated event counter 134.

In some embodiments, control transfer events may include instructions and/or states that are associated with ROP attacks. For example, control transfer events may include instances of control transfer instructions such as subroutine call instructions, subroutine return instructions, branch or jump instructions, etc. Further, control transfer events can include pairs of associated instructions (i.e., specific types of instructions executed within a given range of each other). Furthermore, control transfer events can include branch or return mispredictions.

In some embodiments, the ROP detection logic 140 may increment or decrement a particular event counter 134 in response to instances of a particular type of control transfer instructions (e.g., call or return instructions, branch or jump instructions, etc.) and/or mispredictions of control transfer instructions. For example, in some embodiments, a particular event counter 134 may be incremented in response to detecting a control transfer instruction associated with popping (i.e., removing) an instruction return pointer value from the call stack (e.g., a return instruction). Further, in some embodiments, the particular event counter 134 may be decremented in response to a detecting a control transfer instruction associated with pushing (i.e., storing) an instruction return pointer value on the call stack (e.g., a call instruction).

In another example, in some embodiments, a given event counter 134 may be incremented in response to a detection of a return instruction. Further, in some embodiments, the same event counter 134 may be decremented in response to a detection of a call instruction. Note that, in normal operation (i.e., when not under a ROP attack), a call instruction is typically followed some instructions later by a corresponding return instruction. Accordingly, in normal operation, count increases are generally balanced by count decreases, and thus the event counter 134 may remain within a specific range around the zero value. However, in the event of a ROP attack, the number of return instructions may substantially exceed the number of call instructions (referred to as a return-call imbalance). Therefore, under a ROP attack, the event counter 134 may increase beyond the specific range around the zero value.

In yet another example, in some embodiments, a particular event counter 134 may be incremented in response to a detection of a mispredicted return instruction. Further, in some embodiments, the same event counter 134 may be decremented in response to a detection of a correctly predicted return instruction.

In still another example, in some embodiments, a given event counter 134 may be incremented in response to a detection of a mispredicted branch instruction. Further, in some embodiments, the same event counter 134 may be decremented in response to a detection of a correctly predicted branch instruction. In some embodiments, the event counter 134 may be incremented in response to a detection of a particular type of mispredicted branch (e.g., a mispredicted indirect branch, a mispredicted far branch, etc.).

In a further example, in some embodiments, a particular event counter 134 may be incremented by a defined amount (e.g., 1, 2, 3, etc.) in response to a detection of a stack pivot. As used herein, the term "stack pivot" refers to a return instruction associated with an instruction moving the stack pointer to a new memory location.

In one or more embodiments, each event counter 134 may be limited to a predefined window. For example, each event counter 134 may reset the count after a specific number of instructions (e.g., 10, 100, 1000, etc.) are processed in the core 115. In another example, each event counter 134 may be a circular buffer storing a given number of instructions. In yet another example, each event counter 134 may reset the count after a given time period (e.g., 1 millisecond, 1 second, 1 minute, etc.) has expired. In such embodiments, a particular event counter 134 may reflect a return-call imbalance occurring within the predefined window (e.g., ten more return instructions than call instructions processed during a window of 1000 instructions). In some embodiments, each event counter 134 may include a saturating mode to prevent the count from exceeding maximum and/or minimum limits. For example, in some embodiments, a given event counter 134 may clip the count to a maximum count limit (e.g., a hardware buffer capacity) in the case of a count increment, and/or may clip the count to the minimum count limit in the case of a count decrement.

In one or more embodiments, the ROP detection logic 140 may detect that an event counter 134 has reached a threshold level associated with that event counter 134. In response to this detection, the ROP detection logic 140 may access a counter register 136 associated with that event counter 134. In one or more embodiments, the counter register 136 may store configuration data for the event counter 134.

In some embodiments, the configuration data for the event counter 134 may identify one or more of check registers 138. Each check register 138 may include data describing a unique type of heuristic ROP check. Thus, in some embodiments, the ROP detection logic 140 may use the configuration data for a particular event counter 134 (i.e., read from the associated counter register 136) to identify a set of check registers 138. Further, the ROP detection logic 140 may use the data stored in this set of check registers 138 to identify a set of heuristic ROP checks. In some embodiments, the ROP detection logic 140 may trigger or use firmware functions of the processor 110 to perform the identified set of heuristic ROP checks. Each type of heuristic ROP check may be used to provide an separate indication that the system 100 may be under a ROP attack. Some examples of heuristic ROP checks are described below with reference to FIGS. 2B-2D.

In some embodiments, the ROP detection logic 140 may identify a possible ROP attack based on the results of the identified set of ROP heuristic checks. For example, the ROP detection logic 140 may identify a possible ROP attack when at least one of the identified set of ROP heuristic checks provides an attack indication. In another example, the ROP detection logic 140 may identify a possible ROP attack when a majority of the identified set of ROP heuristic checks provide attack indications. In still another example, the ROP detection logic 140 may identify a possible ROP attack when at least a minimum number of the identified set of ROP heuristic checks provide attack indications. Further, in some embodiments, the ROP detection logic 140 may evaluate each ROP heuristic check as having a particular weight or relative importance, and may identify a possible ROP attack based on the combined weights of the ROP heuristic checks that provide attack indications.

In some embodiments, the ROP detection logic 140 may provide an indication (e.g., an interrupt, an exception, a signal, etc.) of the possible ROP attack to the OS 122 and/or the protection software 124. In response, in one or more embodiments, the OS 122 and/or the protection software 124 may undertake actions to prevent and/or interrupt the ROP attack (e.g., system or process stoppage, memory quarantine, event logging, user notification, etc.).

In one or more embodiments, the ROP detection logic 140 can adjust a sensitivity level based on an estimated threat level and/or desired level of protection against ROP attacks (e.g., low, medium, high, etc.). For example, the ROP detection logic 140 may increase the thresholds used by the event counters 134 in response to a lowered threat or protection level, thereby requiring a greater count to be reached before triggering an attack notification (i.e., decreasing sensitivity to an ROP attack). Similarly, the ROP detection logic 140 may lower the thresholds used by the event counters 134 in response to a heightened threat or protection level, thereby requiring a smaller count to be reached before triggering an attack notification (i.e., increasing sensitivity to an ROP attack). In another example, the ROP detection logic 140 may increase or decrease the length of the windows used by the event counters 134 to adjust sensitivity to an ROP attack.

In one or more embodiments, the ROP detection logic 140 may be implemented in hardware components of the processor 110. For example, the ROP detection logic 140 may be implemented in circuitry and/or micro-architecture of the core 115 and/or the processor 110. Further, in some embodiments, the ROP detection logic 140 may be at least partially implemented in firmware and/or software. Furthermore, the ROP detection logic 140 may be implemented within the processor 110, and/or any other component accessible or medium readable by processor 110, such as memory 120. In one or more embodiments, the ROP detection logic 140 may include hardware circuitry dedicated to detecting ROP attacks. While shown as a particular implementation in the embodiment of FIG. 1A, the scope of the various embodiments discussed herein is not limited in this regard.

Figure 1B:
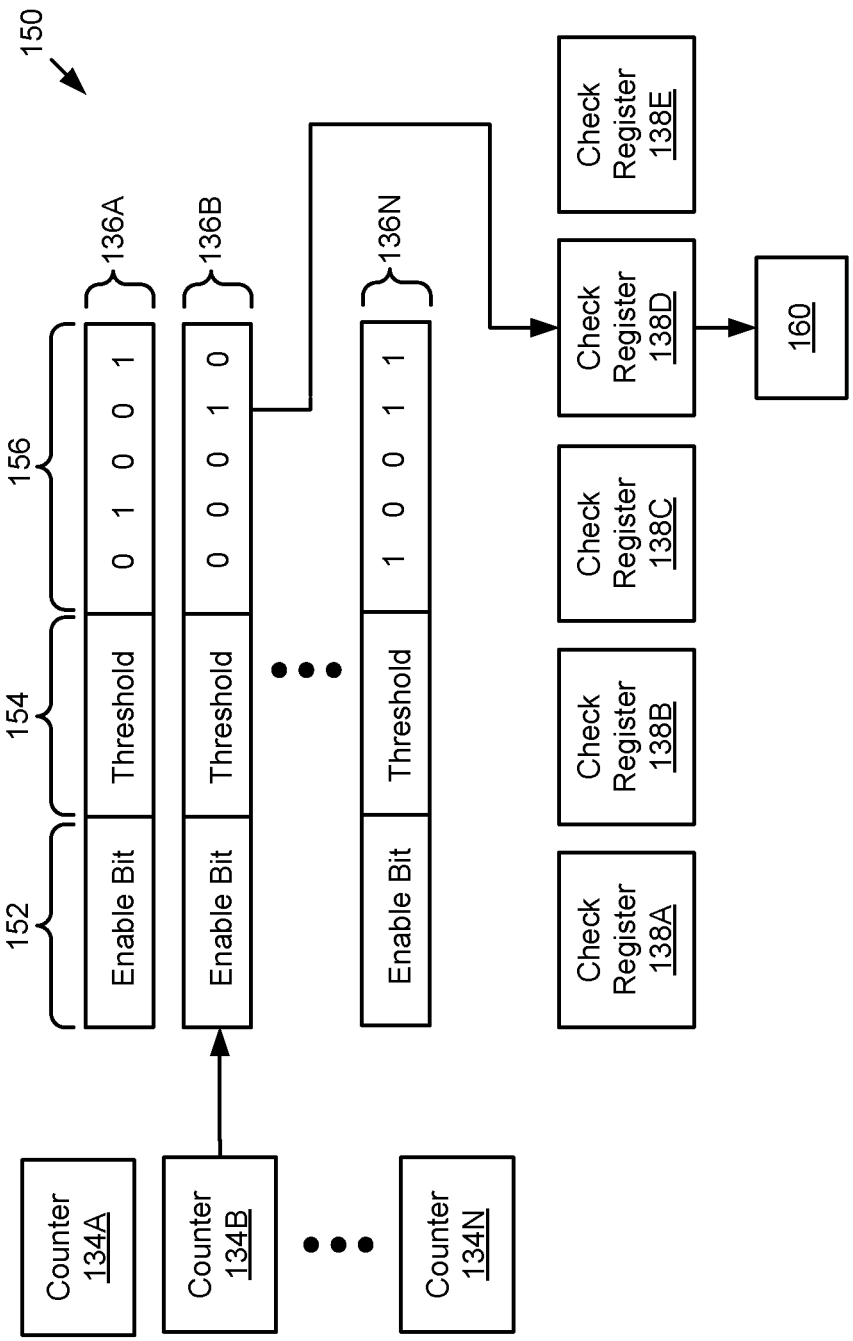
FIG. 1B is a block diagram of an example operation in accordance with one or more embodiments.

Referring now to FIG. 1B, shown is a block diagram of an example operation 150 in accordance with some embodiments. Assume that the example operation 150 is performed with an example embodiment of the system 100 (shown in FIG. 1A). Specifically, the example operation 150 may be performed by the ROP detection logic 140.

As shown in FIG. 1B, the example operation 150 may involve a set of event counters 134A-134N, a set of counter registers 136A-136N, and a set of check registers 138A-138E. In some embodiments, each of the counter registers 136A-136N may store configuration data for a corresponding one of the event counters 134A-134N. For example, as shown in FIG. 1B, each of the counter registers 136A-136N may include an enable bit 152, a threshold field 154, and a check bitmap 156.

In some embodiments, the enable bit 152 may be a single bit indicating whether the corresponding one of the event counters 134A-134N is currently enabled (i.e., in active use). The threshold field 154 may store the threshold value defined for the corresponding one of the event counters 134A-134N. For example, the threshold field 154 may be set to a count level or percentage that indicates a high probability that a system is under a ROP attack. The check bitmap 156 may include bits associated with the check registers 138A-138E. In some embodiments, each bit of the check bitmap 156 indicates that the associated check register 138 is to be accessed, and that the ROP heuristic check corresponding to the check register 138 is to be performed. For example, each bit of the check bitmap 156 may indicate whether a corresponding one of the check registers 138A-138E is to be accessed when an associated event counter 134 reaches a threshold. Some examples of heuristic ROP checks that may be associated with the check registers 138A-138E are described below with reference to FIGS. 2B-2D.

Assume that, in the example of FIG. 1B, the enable bit 152 in the counter register 136B is set to enable the event counter 134B. Assume further that the event counter 134B has reached the threshold value specified in the threshold field 154 of counter register 136B. In response, the ROP detection logic 140 (shown in FIG. 1A) may access the check bitmap 156 in the counter register 136B. The ROP detection logic 140 may then determine that the bit "1" corresponding to the check register 138D is enabled, thus indicating that an associated ROP heuristic check is to be performed. In some embodiments, the ROP detection logic 140 may read check data associated with the associated ROP heuristic check directly from the check register 138D. In other embodiments, the ROP detection logic 140 may access a memory address 160 storing data associated with the associated ROP heuristic check, defined in the check register 138D. The ROP detection logic 140 may perform the associated ROP heuristic check using the data from memory address 160, and may thus determine whether there is a possible ROP attack.

Figure 2A:
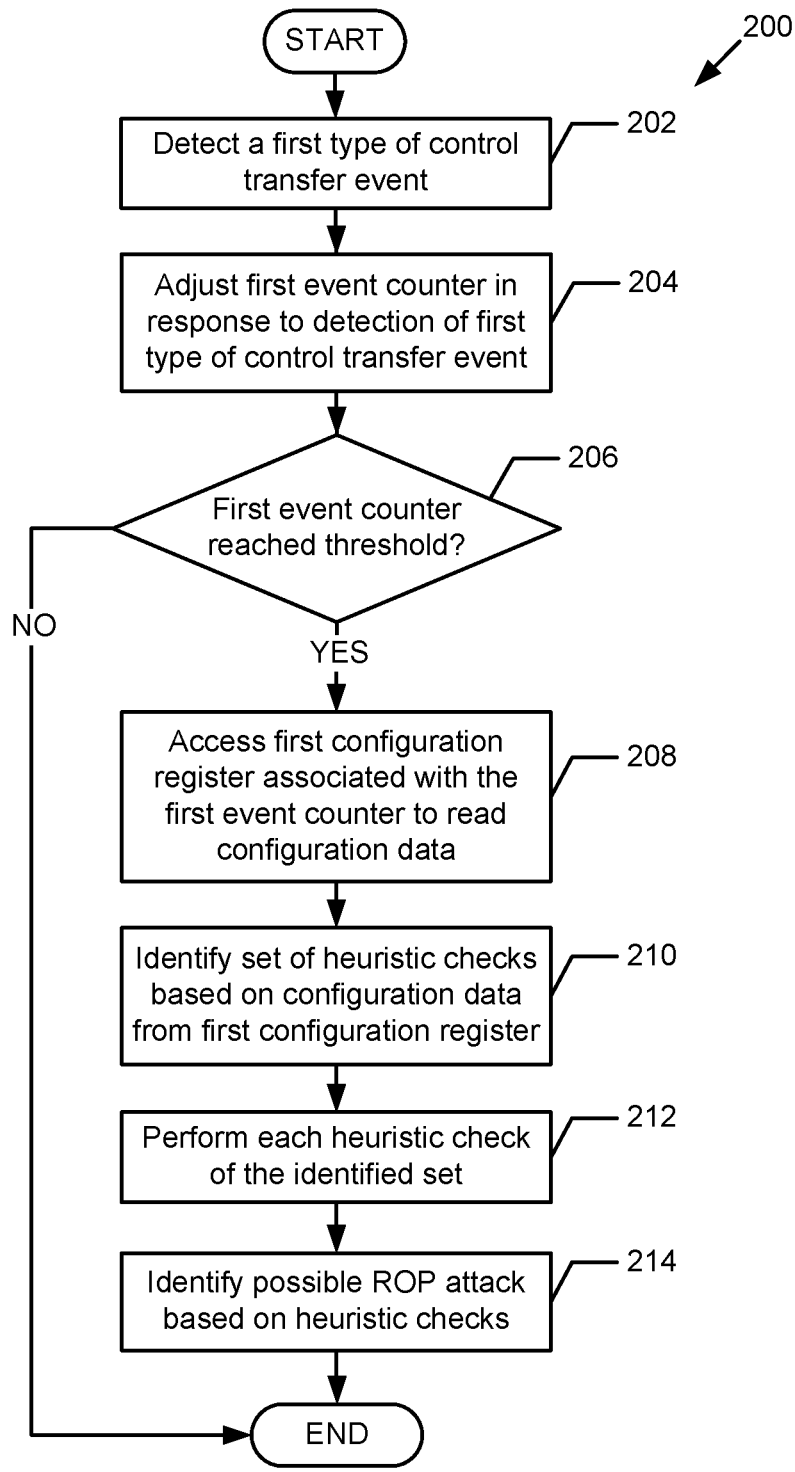
FIGS. 2A-2D are example sequences in accordance with one or more embodiments.

Referring now to FIG. 2A, shown is a sequence 200 for detecting a ROP attack, in accordance with one or more embodiments. In one or more embodiments, the sequence 200 may be performed by the ROP detection logic 140 shown in FIG. 1A. The sequence 200 may be implemented in various embodiments, including hardware embodiments, firmware embodiments, software embodiments, or some combination thereof. In firmware or software embodiments, it may be implemented by computer executed instructions stored in a non-transitory computer readable medium, such as an optical, semiconductor, or magnetic storage device.

At box 202, a first type of control transfer event may be detected. For example, referring to FIG. 1A, the ROP detection logic 140 may detect instances of a particular type of control transfer instructions (e.g., call instructions, return instructions, branch or jump instructions, etc). In another example, the ROP detection logic 140 may detect mispredictions of control transfer instructions.

At box 204, a first event counter may be adjusted in response to the detection (at box 202) of the first type of control transfer event. For example, referring to FIGS. 1A-1B, the ROP detection logic 140 may increment the event counter 134B in response to each instance of a particular type of control transfer instruction.

At box 206, a determination about whether the first event counter reached a predefined threshold is made. For example, referring to FIGS. 1A-1B, the ROP detection logic 140 may determine whether the value of event counter 134B is equal to and/or and greater than an associated threshold value.

If it is determined at box 206 that the first event counter has not reached the threshold, then the sequence 200 ends. However, if it is determined at box 206 that the first event counter has reached the threshold, then at box 208, a first configuration register may be accessed to read configuration data for the first event counter. For example, referring to FIGS. 1A-1B, the ROP detection logic 140 may access the counter register 136B, and may read configuration data for the event counter 134B.

At box 210, a set of heuristic checks may be identified based on the configuration data in the first configuration register. For example, referring to FIGS. 1A-1B, the ROP detection logic 140 may use the check bitmap 156 in the counter register 136B to identify the check register 138D. The ROP detection logic 140 may read the check register 138D to read the memory address 160. The check register 138D and/or the memory address 160 may be used to uniquely identify a type of ROP heuristic check.

At box 212, each heuristic check of the identified set of heuristic checks may be performed. For example, referring to FIGS. 1A-1B, the ROP detection logic 140 may perform a ROP heuristic check using data stored in the memory address 160 (specified in the check register 138D).

At box 214, a possible ROP attack may be identified based on the results of performing the set of heuristic checks. For example, referring to FIGS. 1A-1B, the ROP detection logic 140 may evaluate the results of the ROP heuristic check to determine whether there is a possible ROP attack. If so, in some embodiments, the ROP detection logic 140 may provide an indication or notification of the possible ROP attack. For example, the ROP detection logic 140 may send an ROP attack notification to the OS 122 and/or the protection software 124. In some embodiments, the ROP attack notification may trigger the OS 122 and/or the protection software 124 to take one or more actions to address the ROP attack (e.g., monitor suspected code, quarantine suspected code, notify an administrator or a management system, halt execution, shut down a system, etc.). After box 214, the sequence 200 ends.

Figure 2B:
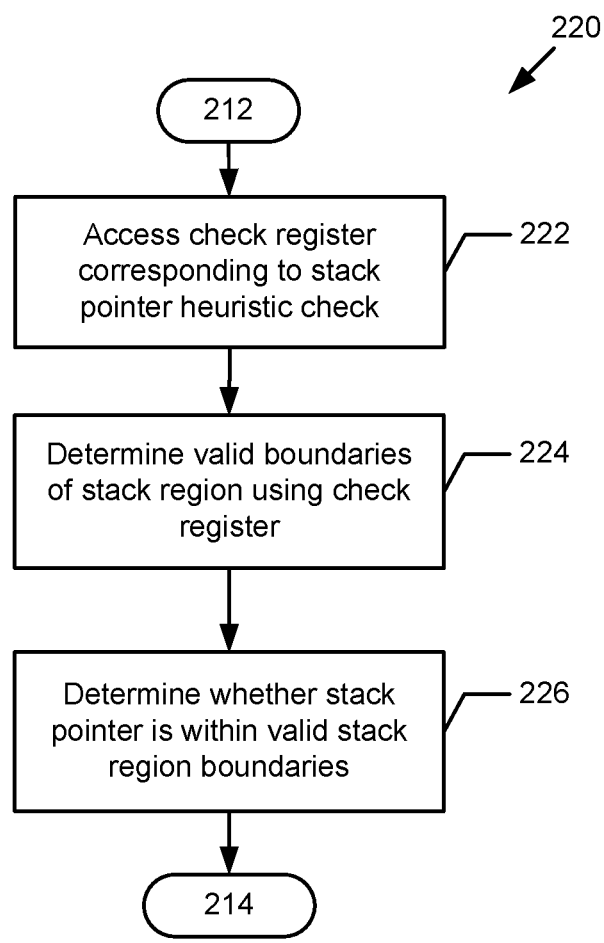

Referring now to FIG. 2B, shown is a sequence 220 for performing a stack pointer heuristic check, in accordance with one or more embodiments. In particular, the sequence 220 illustrates an exemplary expansion of the actions involved in box 212 (shown in FIG. 2A) in the event that a stack pointer heuristic check was identified at box 210 (shown in FIG. 2A). In one or more embodiments, the sequence 220 may be performed by the ROP detection logic 140 shown in FIG. 1A. The sequence 220 may be implemented in various embodiments, including hardware embodiments, firmware embodiments, software embodiments, or some combination thereof. In firmware or software embodiments, it may be implemented by computer executed instructions stored in a non-transitory computer readable medium, such as an optical, semiconductor, or magnetic storage device.

At box 222, a check register corresponding to a stack pointer heuristic check may be accessed. For example, referring to FIGS. 1A-1B, the ROP detection logic 140 may access the check register 138D. In some embodiments, the check register 138D may store data related to a stack pointer heuristic check. For example, the check register 138D may point to or otherwise identify a function stored in firmware of the processor 110. In another example, the ROP detection logic 140 may use the check register 138D to identify the memory address 160. The memory address 160 may store data used to perform a stack pointer heuristic check.

At box 224, the boundaries of a valid stack region may be determined using the check register (accessed at box 222). For example, referring to FIGS. 1A-1B, the ROP detection logic 140 may perform or trigger a firmware function for a stack pointer heuristic check. The ROP detection logic 140 and/or the firmware function may use the check register 138D to identify and read the memory address 160. The memory address 160 may store data defining valid stack regions. In some embodiments, such data may specify one or more memory regions that are specified and/or reserved as the only valid regions for storing the call stack. For example, the data defining valid stack regions may include data pairs of starting and ending addresses, data pairs of starting addresses and lengths, data pairs of base/mask for regions, and so forth.

At box 226, it may be determined whether the stack pointer is located within the valid stack region boundaries (determined at box 224). For example, referring to FIGS. 1A-1B, the ROP detection logic 140 may determine whether the current stack pointer is pointing to a location within the memory regions that are specified as being valid regions for storing the call stack.

After box 226, the sequence 220 may continue at step 214 (shown in FIG. 2A). For example, the results of the stack pointer heuristic check may be used to identify a possible ROP attack. In some embodiments, if the heuristic check results indicate that the stack pointer is not located within the valid stack region boundaries, the ROP detection logic 140 may determine that an ROP attack it is more likely to be occurring. However, if the check results indicate that the stack pointer is located within the valid stack region boundaries, the ROP detection logic 140 may determine that an ROP attack it is less likely to be occurring. In some embodiments, the ROP detection logic 140 may weigh the results of multiple heuristic checks before providing an indication of a possible ROP attack.

Figure 2C:
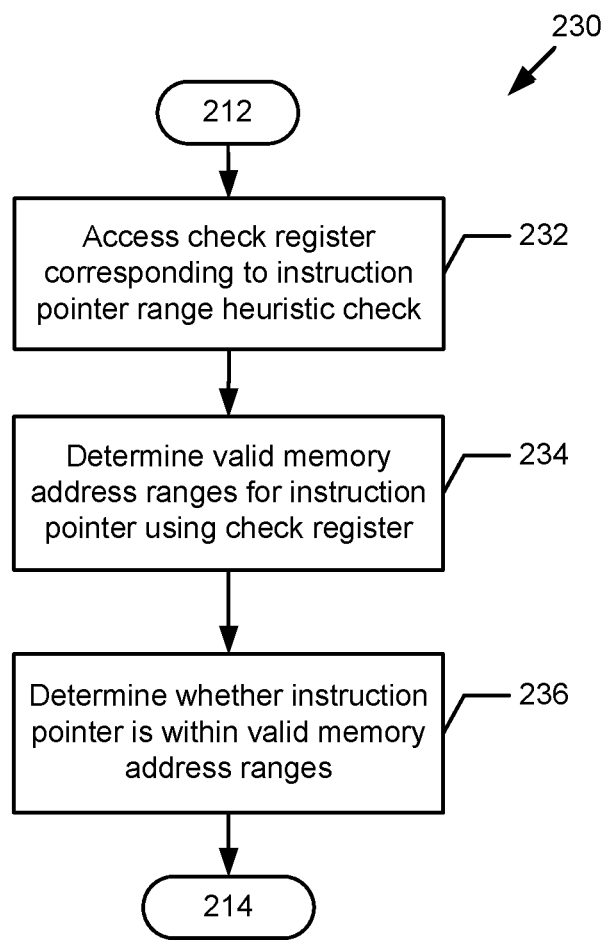

Referring now to FIG. 2C, shown is a sequence 230 for performing an instruction pointer range heuristic check, in accordance with one or more embodiments. In particular, the sequence 230 illustrates an exemplary expansion of the actions involved in box 212 (shown in FIG. 2A) in the event that an instruction pointer range heuristic check was identified at box 210 (shown in FIG. 2A). In one or more embodiments, the sequence 230 may be performed by the ROP detection logic 140 shown in FIG. 1A. The sequence 230 may be implemented in various embodiments, including hardware embodiments, firmware embodiments, software embodiments, or some combination thereof. In firmware or software embodiments, it may be implemented by computer executed instructions stored in a non-transitory computer readable medium, such as an optical, semiconductor, or magnetic storage device.

At box 232, a check register corresponding to an instruction pointer range heuristic check may be accessed. For example, referring to FIGS. 1A-1B, the ROP detection logic 140 may access the check register 138B. In some embodiments, the check register 138B may store data related to an instruction pointer range heuristic check. For example, the check register 138B may point to or otherwise identify a firmware function to perform an instruction pointer range heuristic check. In another example, the ROP detection logic 140 may use the check register 138B to identify the memory address 160. The memory address 160 may store data used to perform an instruction pointer range heuristic check.

At box 234, the boundaries of valid memory address ranges for an instruction pointer may be determined using the check register (accessed at box 232). For example, referring to FIGS. 1A-1B, the ROP detection logic 140 may perform or trigger a firmware function for an instruction pointer range heuristic check. The ROP detection logic 140 and/or the firmware function may use the check register 138B to access data defining valid memory address ranges for an instruction pointer may include data pairs of starting and ending addresses, data pairs of starting addresses and lengths, data pairs of base/mask for ranges, and so forth.

At box 236, it may be determined whether the instruction pointer is located within the valid memory address ranges (determined at box 234). For example, referring to FIGS. 1A-1B, the ROP detection logic 140 may determine whether the current instruction pointer is pointing to a memory address that is included in the memory address ranges that are specified as being valid for storing instructions.

After box 236, the sequence 230 may continue at step 214 (shown in FIG. 2A). For example, the results of the instruction pointer range heuristic check may be used to identify a possible ROP attack. In some embodiments, if the heuristic check results indicate that the instruction pointer is not located within the valid memory address ranges, the ROP detection logic 140 may determine that an ROP attack it is more likely to be occurring. However, if the check results indicate that the instruction pointer is located within the valid memory address ranges, the ROP detection logic 140 may determine that an ROP attack it is less likely to be occurring.

Figure 2D:
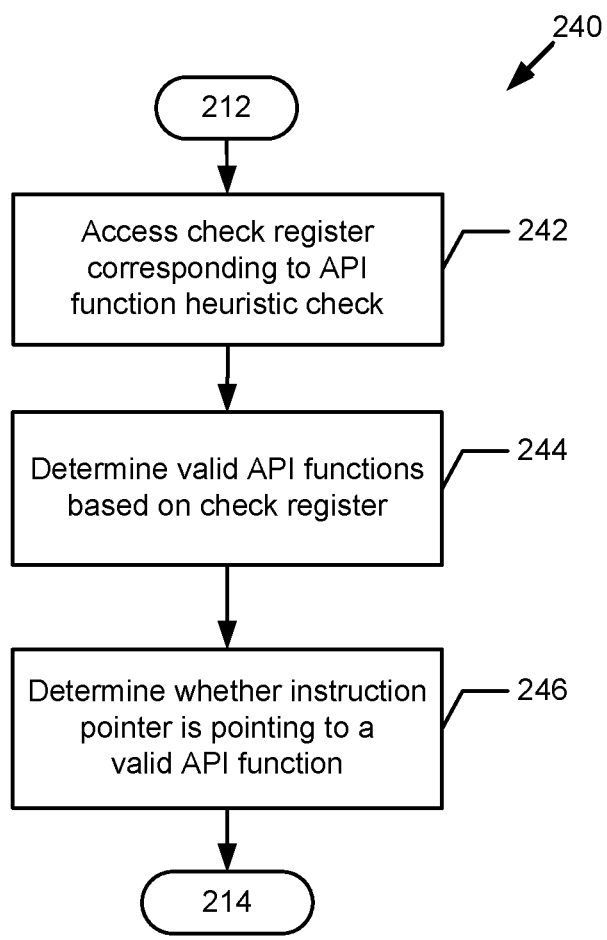

Referring now to FIG. 2D, shown is a sequence 240 for performing an Application Programming Interface (API) function heuristic check, in accordance with one or more embodiments. In particular, the sequence 240 illustrates an exemplary expansion of the actions involved in box 212 (shown in FIG. 2A) in the event that an API function heuristic check was identified at box 210 (shown in FIG. 2A). In one or more embodiments, the sequence 240 may be performed by the ROP detection logic 140 shown in FIG. 1A. The sequence 240 may be implemented in various embodiments, including hardware embodiments, firmware embodiments, software embodiments, or some combination thereof. In firmware or software embodiments, it may be implemented by computer executed instructions stored in a non-transitory computer readable medium, such as an optical, semiconductor, or magnetic storage device.

At box 242, a check register corresponding to an API function heuristic check may be accessed. For example, referring to FIGS. 1A-1B, the ROP detection logic 140 may access the check register 138C. In some embodiments, the check register 138C may store data related to an API function heuristic check. For example, the check register 138C may point to or otherwise identify a firmware function to perform an API function heuristic check. In another example, the ROP detection logic 140 may use the check register 138C to identify the memory address 160. The memory address 160 may store data used to perform an API function heuristic check.

At box 244, a set of valid API functions may be determined using the check register (accessed at box 242). For example, referring to FIGS. 1A-1B, the ROP detection logic 140 may perform or trigger a firmware function for an API function heuristic check. The ROP detection logic 140 and/or the firmware function may use the check register 138C to access data defining a set of valid API functions. The data defining the valid API functions may include a list of API function identifiers, data pairs including the beginning and end points of each valid API function, a list of valid entry points to valid API functions, and so forth.

At box 246, it may be determined whether the instruction pointer is pointing to one of the valid API functions (determined at box 244). For example, referring to FIGS. 1A-1B, the ROP detection logic 140 may determine whether the current instruction pointer is pointing to a memory address that is associated with a valid API function.

After box 246, the sequence 240 may continue at step 214 (shown in FIG. 2A). For example, the results of the API function heuristic check may be used to identify a possible ROP attack. In some embodiments, if the heuristic check results indicate that the instruction pointer is not pointing to a valid API function, the ROP detection logic 140 may determine that an ROP attack it is more likely to be occurring. However, if the check results indicate that the instruction pointer is pointing to a valid API function, the ROP detection logic 140 may determine that an ROP attack it is less likely to be occurring.

Note that the examples shown in FIGS. 1A-1B and 2A-2D are provided for the sake of illustration, and are not intended to limit any embodiments. For instance, while some examples describe incrementing or decrementing the event counters 134 by a quantity of one, any other quantity (e.g., two, four, five, etc.). Further, it is contemplated that the event counters 134 may be adjusted based on any type of control transfer events. For example, the event counters 134 may be adjusted up or down based on subroutine call instructions (e.g., CALL), subroutine return instructions (e.g., RET), branch or jump instructions (e.g., IF-THEN, JMP, GOTO), stack instructions (e.g., PUSH, POP), and/or any combination thereof. In another example, referring to FIG. 1A, it is contemplated that the event counters 134, counter registers 136, check registers 138, and ROP detection logic 140 may be included in the processor 110, but may be external to the processing cores 115.

Note also that, while embodiments may be shown in simplified form for the sake of clarity, embodiments may include any number and/or arrangement of processors, cores, and/or additional components (e.g., buses, storage media, connectors, power components, buffers, interfaces, etc.). In particular, it is contemplated that some embodiments may include any number of components in addition to those shown, and that different arrangement of the components shown may occur in certain implementations. Further, it is contemplated that specifics in the examples shown in FIGS. 1A-1B and 2A-2D may be used anywhere in one or more embodiments.

Figure 3A:
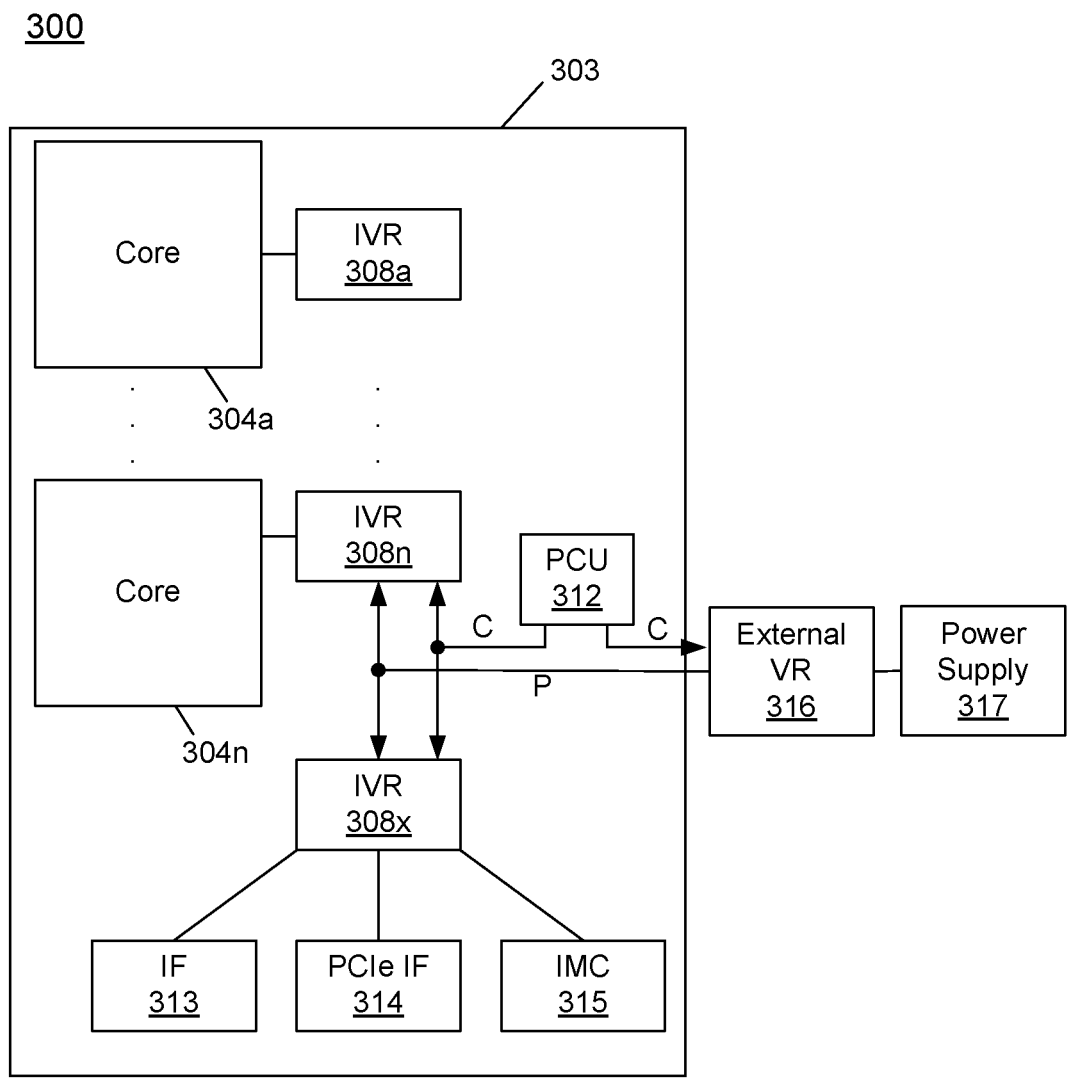
FIG. 3A is a block diagram of a portion of a system in accordance with one or more embodiments.

Referring now to FIG. 3A, shown is a block diagram of a system 300 in accordance with an embodiment of the present invention. As shown in FIG. 3A, system 300 may include various components, including a processor 303 which as shown is a multicore processor. Processor 303 may be coupled to a power supply 317 via an external voltage regulator 316, which may perform a first voltage conversion to provide a primary regulated voltage to processor 303.

As seen, processor 303 may be a single die processor including multiple cores 304a-304n. In addition, each core 304 may be associated with an integrated voltage regulator (IVR) 308a-308n which receives the primary regulated voltage and generates an operating voltage to be provided to one or more agents of the processor associated with the IVR 308. Accordingly, an IVR implementation may be provided to allow for fine-grained control of voltage and thus power and performance of each individual core 304. As such, each core 304 can operate at an independent voltage and frequency, enabling great flexibility and affording wide opportunities for balancing power consumption with performance. In some embodiments, the use of multiple IVRs 308 enables the grouping of components into separate power planes, such that power is regulated and supplied by the IVR 308 to only those components in the group. During power management, a given power plane of one IVR 308 may be powered down or off when the processor is placed into a certain low power state, while another power plane of another IVR 308 remains active, or fully powered.

Still referring to FIG. 3A, additional components may be present within the processor including an input/output interface 313, another interface 314, and an integrated memory controller 315. As seen, each of these components may be powered by another integrated voltage regulator 308x. In one embodiment, interface 313 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 314 may be in accordance with a Peripheral Component Interconnect Express (PCIe™) specification, e.g., the PCI Express™ Specification Base Specification version 2.0 (published Jan. 17, 2007).

Also shown is a power control unit (PCU) 312, which may include hardware, software and/or firmware to perform power management operations with regard to processor 303. As seen, PCU 312 provides control information to external voltage regulator 316 via a digital interface to cause the external voltage regulator 316 to generate the appropriate regulated voltage. PCU 312 also provides control information to IVRs 308 via another digital interface to control the operating voltage generated (or to cause a corresponding IVR 308 to be disabled in a low power mode). In some embodiments, the control information provided to IVRs 308 may include a power state of a corresponding core 304.

In various embodiments, PCU 312 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

While not shown for ease of illustration, understand that additional components may be present within processor 303 such as uncore logic, and other components such as internal memories, e.g., one or more levels of a cache memory hierarchy and so forth. Furthermore, while shown in the implementation of FIG. 3A with an external voltage regulator, embodiments are not so limited.

Although not shown for ease of illustration in FIG. 3A, in some embodiments, processor 303 may include some or all of the components and/or functionality described above with reference to FIGS. 1A-1B and 2A-2D (e.g., event counters 134, counter registers 136, check registers 138, and/or ROP detection logic 140).

Figure 3B:
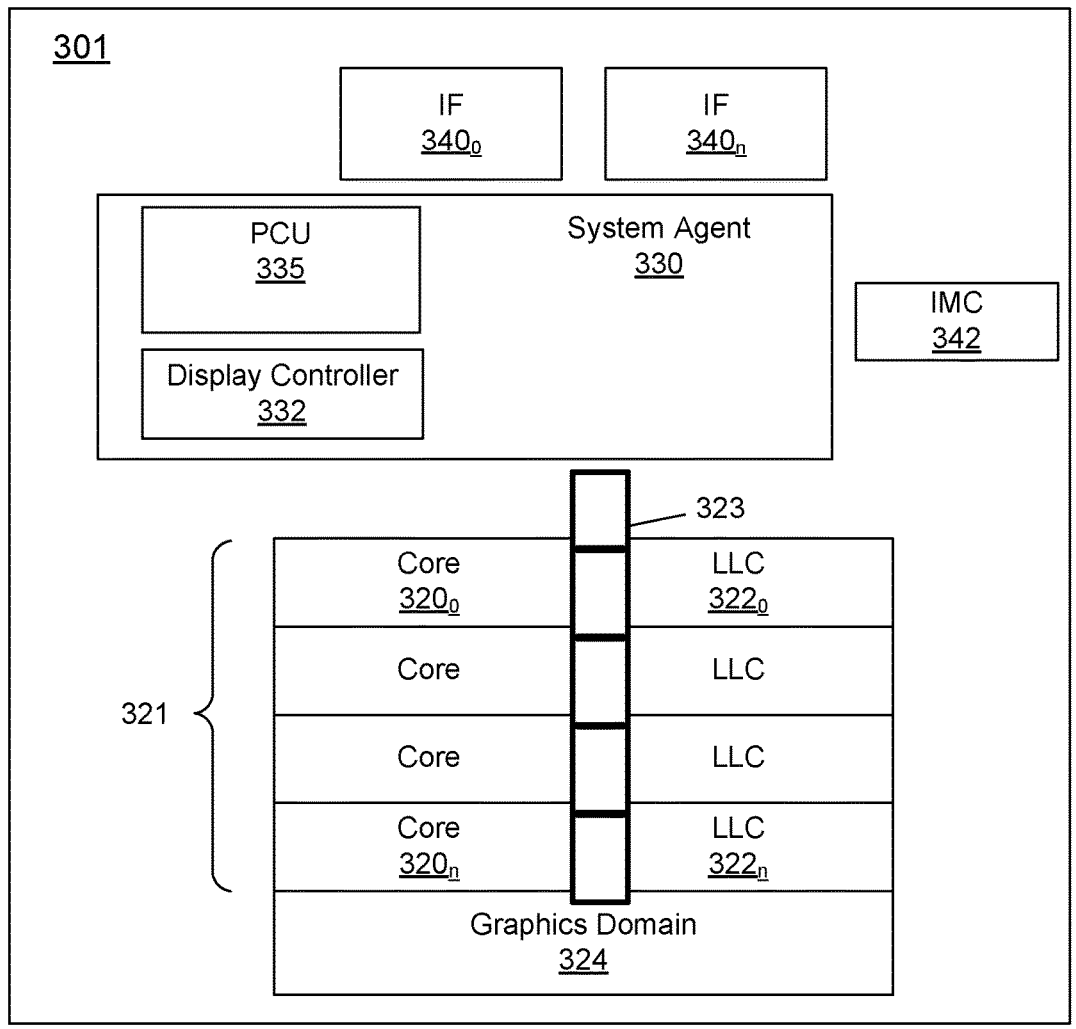
FIG. 3B is a block diagram of a multi-domain processor in accordance with one or more embodiments.

Embodiments can be implemented in processors for various markets including server processors, desktop processors, mobile processors and so forth. Referring now to FIG. 3B, shown is a block diagram of a multi-domain processor 301 in accordance with one or more embodiments. As shown in the embodiment of FIG. 3B, processor 301 includes multiple domains. Specifically, a core domain 321 can include a plurality of cores 3200-320n, a graphics domain 324 can include one or more graphics engines, and a system agent domain 330 may further be present. In some embodiments, system agent domain 330 may execute at an independent frequency than the core domain and may remain powered on at all times to handle power control events and power management such that domains 321 and 324 can be controlled to dynamically enter into and exit high power and low power states. Each of domains 321 and 324 may operate at different voltage and/or power. Note that while only shown with three domains, understand the scope of the present invention is not limited in this regard and additional domains can be present in other embodiments. For example, multiple core domains may be present, with each core domain including at least one core.

In general, each core 320 may further include low level caches in addition to various execution units and additional processing elements. In turn, the various cores may be coupled to each other and to a shared cache memory formed of a plurality of units of a last level cache (LLC) 3220-322n. In various embodiments, LLC 322 may be shared amongst the cores and the graphics engine, as well as various media processing circuitry. As seen, a ring interconnect 323 thus couples the cores together, and provides interconnection between the cores 320, graphics domain 324 and system agent domain 330. In one embodiment, interconnect 323 can be part of the core domain 321. However, in other embodiments, the ring interconnect 323 can be of its own domain.

As further seen, system agent domain 330 may include display controller 332 which may provide control of and an interface to an associated display. In addition, system agent domain 330 may include a power control unit 335 to perform power management.

As further seen in FIG. 3B, processor 301 can further include an integrated memory controller (IMC) 342 that can provide for an interface to a system memory, such as a dynamic random access memory (DRAM). Multiple interfaces 3400-340n may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 3B, understand the scope of the present invention is not limited in this regard.

Although not shown for ease of illustration in FIG. 3B, in some embodiments, processor 301 may include some or all of the components and/or functionality described above with reference to FIGS. 1A-1B and 2A-2D (e.g., event counters 134, counter registers 136, check registers 138, and/or ROP detection logic 140).

Figure 3C:
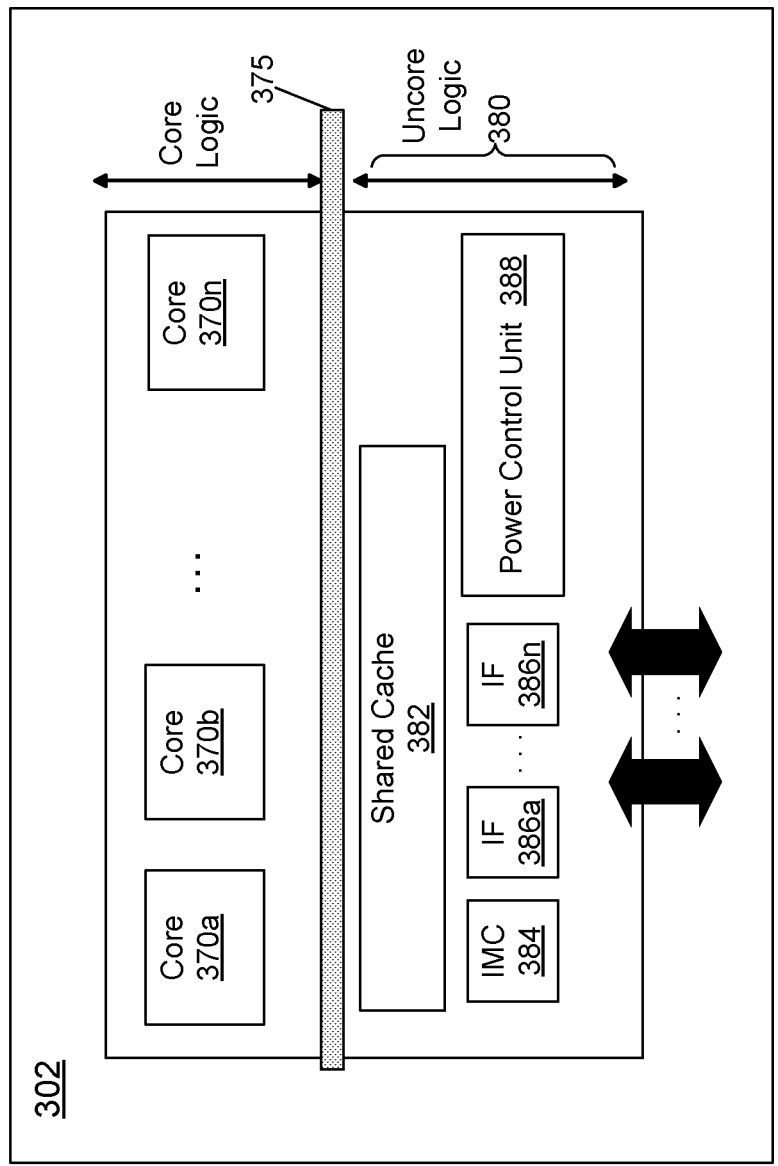
FIG. 3C is a block diagram of a processor in accordance with one or more embodiments.

Referring now to FIG. 3C, shown is a block diagram of a processor 302 in accordance with an embodiment of the present invention. As shown in FIG. 3C, processor 302 may be a multicore processor including a plurality of cores 370a-370n. In one embodiment, each such core may be of an independent power domain and can be configured to enter and exit active states and/or maximum performance states based on workload. The various cores may be coupled via an interconnect 375 to a system agent or uncore 380 that includes various components. As seen, the uncore 380 may include a shared cache 382 which may be a last level cache. In addition, the uncore 380 may include an integrated memory controller 384 to communicate with a system memory (not shown in FIG. 3C), e.g., via a memory bus. Uncore 380 also includes various interfaces 386a-386n and a power control unit 388, which may include logic to perform the power management techniques described herein.

In addition, by interfaces 386a-386n, connection can be made to various off-chip components such as peripheral devices, mass storage and so forth. While shown with this particular implementation in the embodiment of FIG. 3C, the scope of the present invention is not limited in this regard.

Although not shown for ease of illustration in FIG. 3C, in some embodiments, processor 302 may include some or all of the components and/or functionality described above with reference to FIGS. 1A-1B and 2A-2D (e.g., event counters 134, counter registers 136, check registers 138, and/or ROP detection logic 140).

Figure 4:
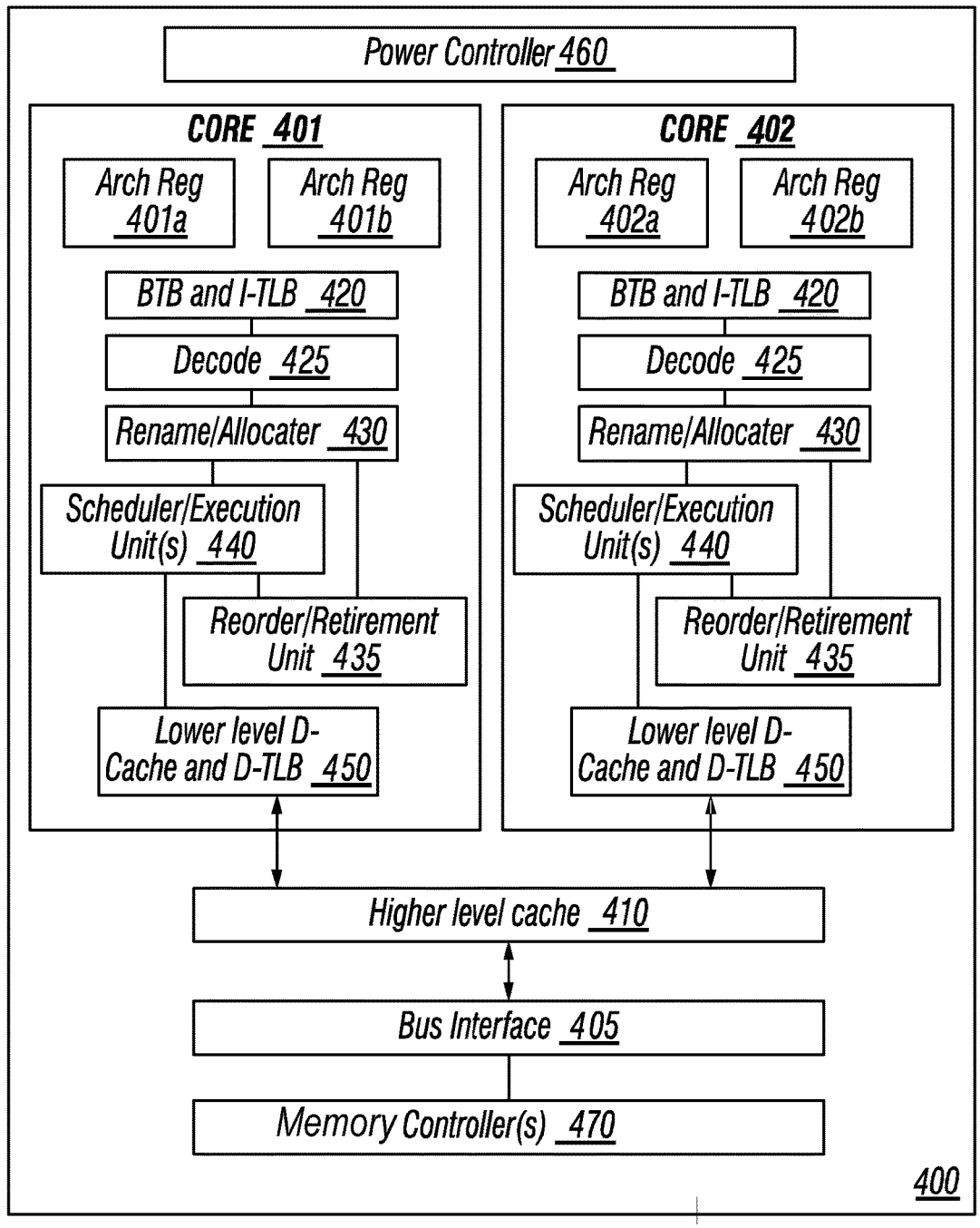
FIG. 4 is a block diagram of a processor including multiple cores in accordance with one or more embodiments.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Although not shown for ease of illustration in FIG. 4, in some embodiments, processor 400 may include some or all of the components and/or functionality described above with reference to FIGS. 1A-1B and 2A-2D (e.g., event counters 134, counter registers 136, check registers 138, and/or ROP detection logic 140).

Figure 5:
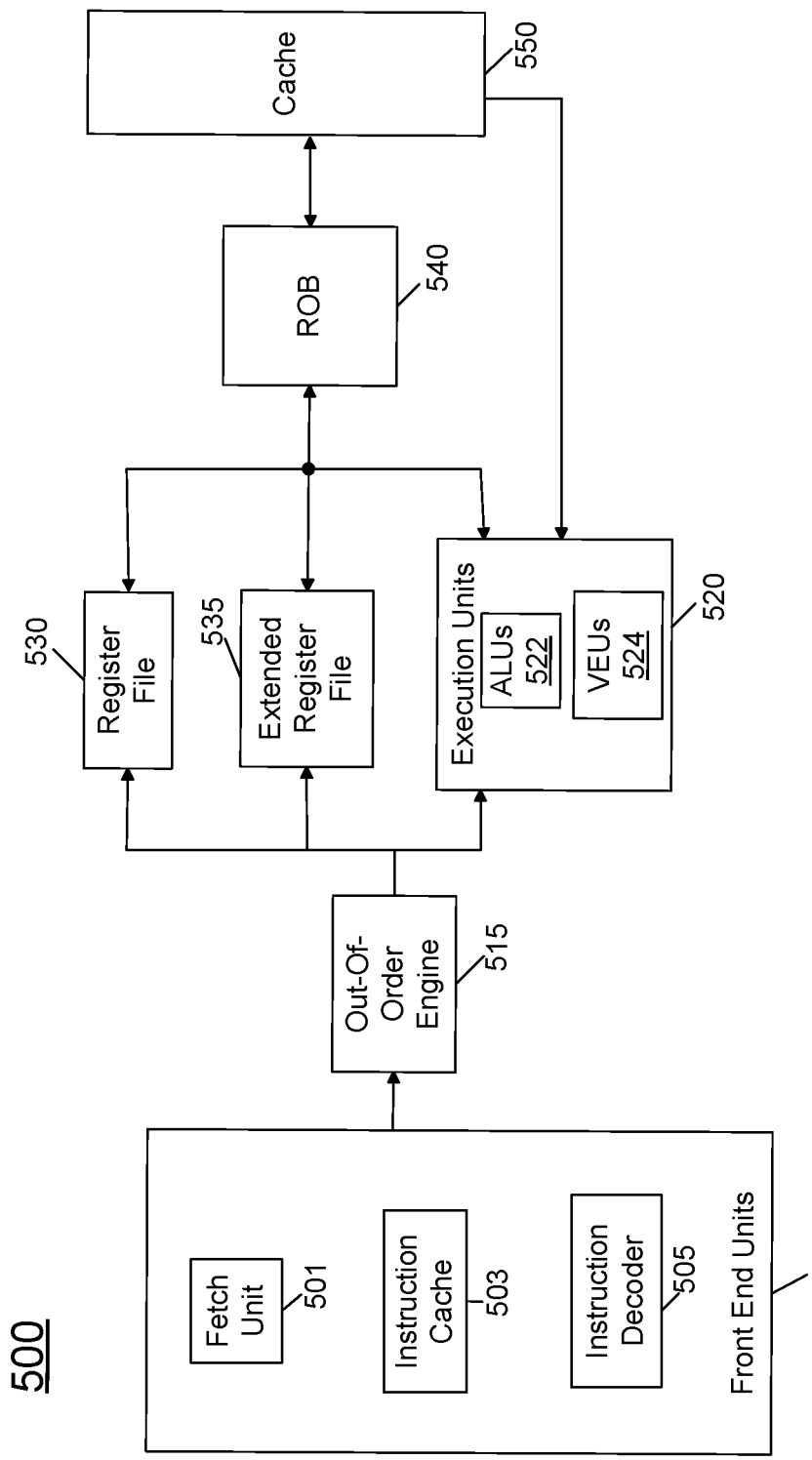
FIG. 5 is a block diagram of a micro-architecture of a processor core in accordance with one or more embodiments.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Although not shown for ease of illustration in FIG. 5, in some embodiments, the core 500 may include some or all of the components and/or functionality described above with reference to FIGS. 1A-1B and 2A-2D (e.g., event counters 134, counter registers 136, check registers 138, and/or ROP detection logic 140).

Figure 6:
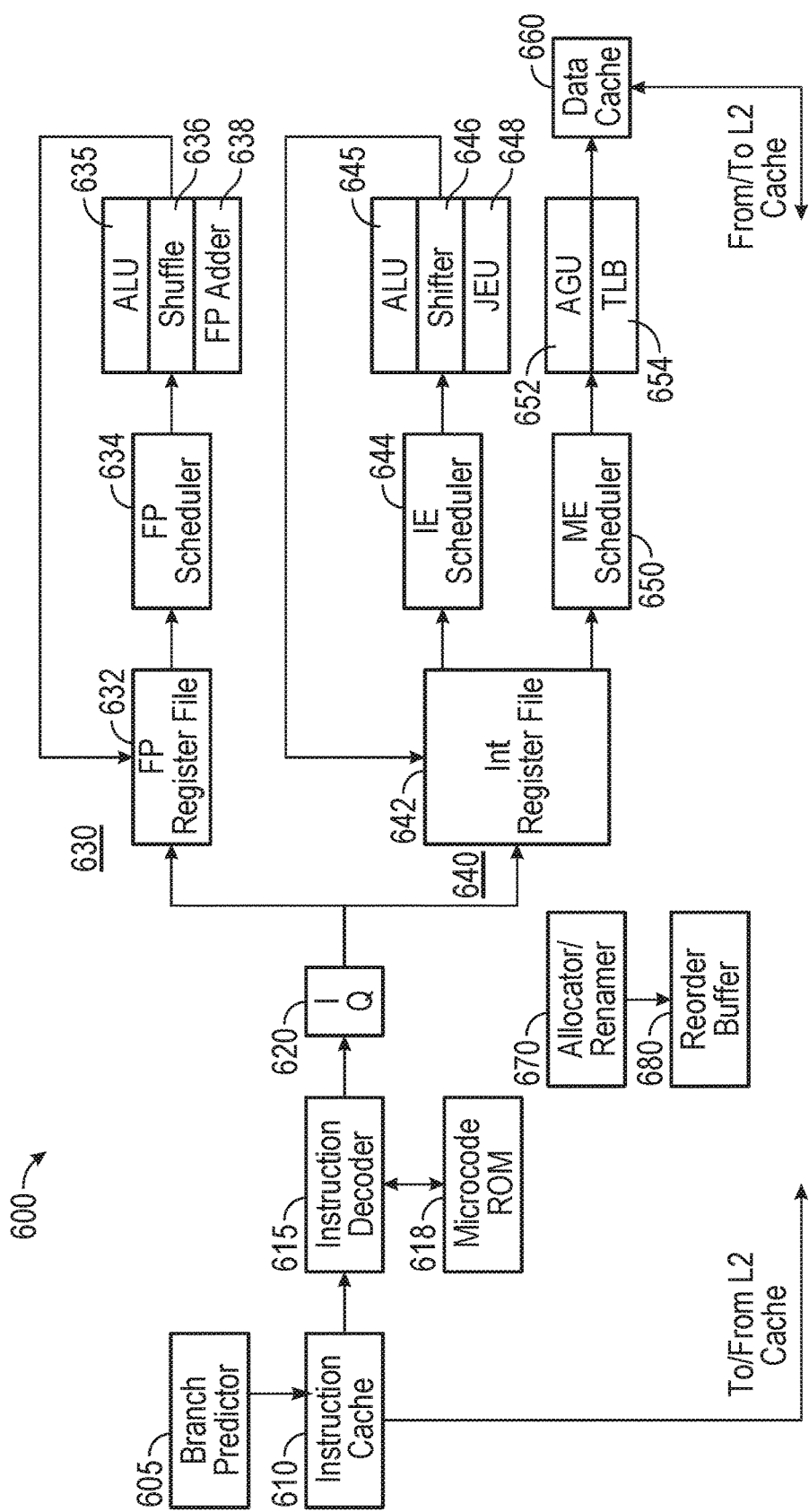
FIG. 6 is a block diagram of a micro-architecture of a processor core in accordance with one or more embodiments.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Although not shown for ease of illustration in FIG. 6, in some embodiments, the core 600 may include some or all of the components and/or functionality described above with reference to FIGS. 1A-1B and 2A-2D (e.g., event counters 134, counter registers 136, check registers 138, and/or ROP detection logic 140).

Figure 7:
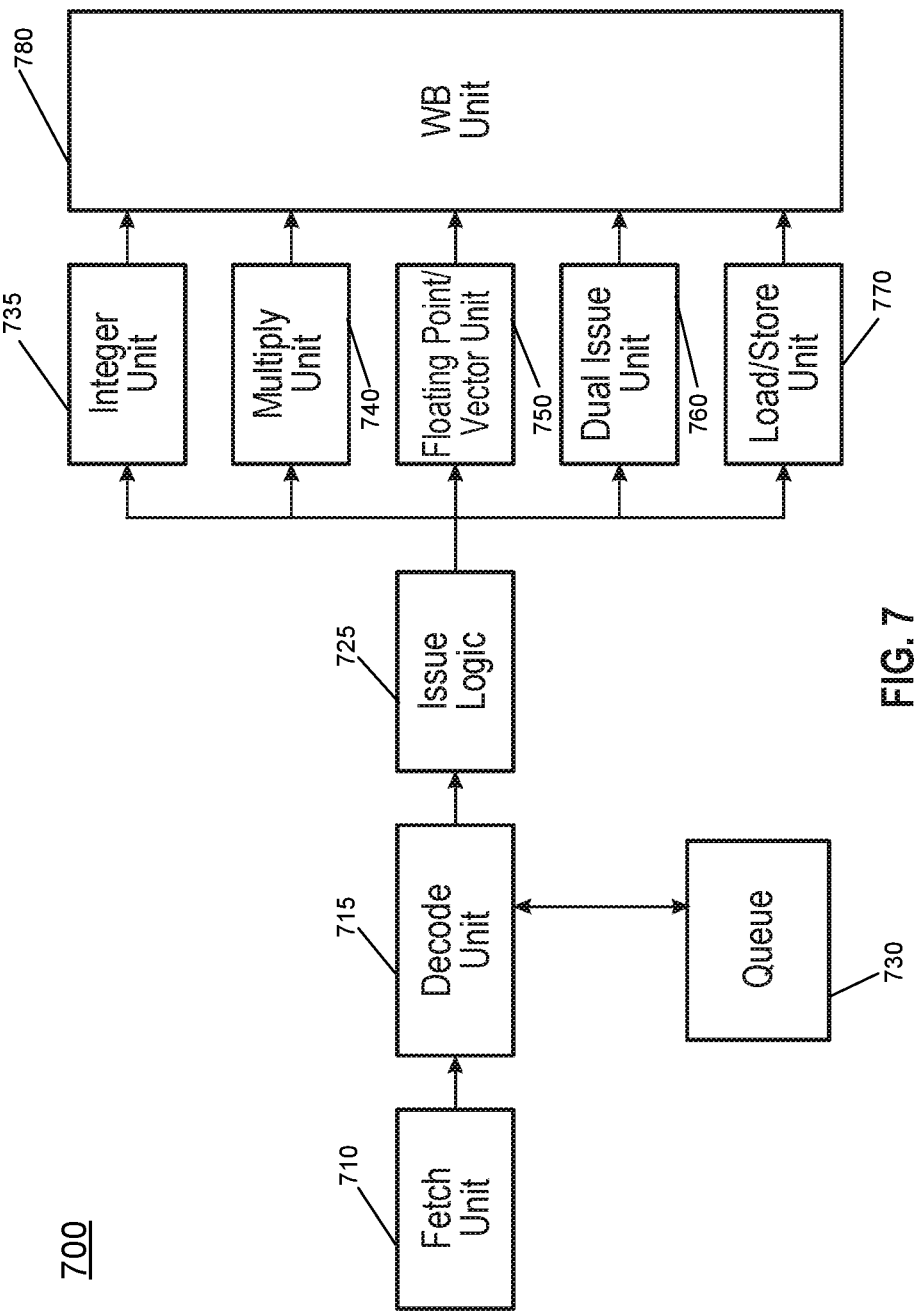
FIG. 7 is a block diagram of a micro-architecture of a processor core in accordance with one or more embodiments.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Although not shown for ease of illustration in FIG. 7, in some embodiments, the core 700 may include some or all of the components and/or functionality described above with reference to FIGS. 1A-1B and 2A-2D (e.g., event counters 134, counter registers 136, check registers 138, and/or ROP detection logic 140).

Figure 8:
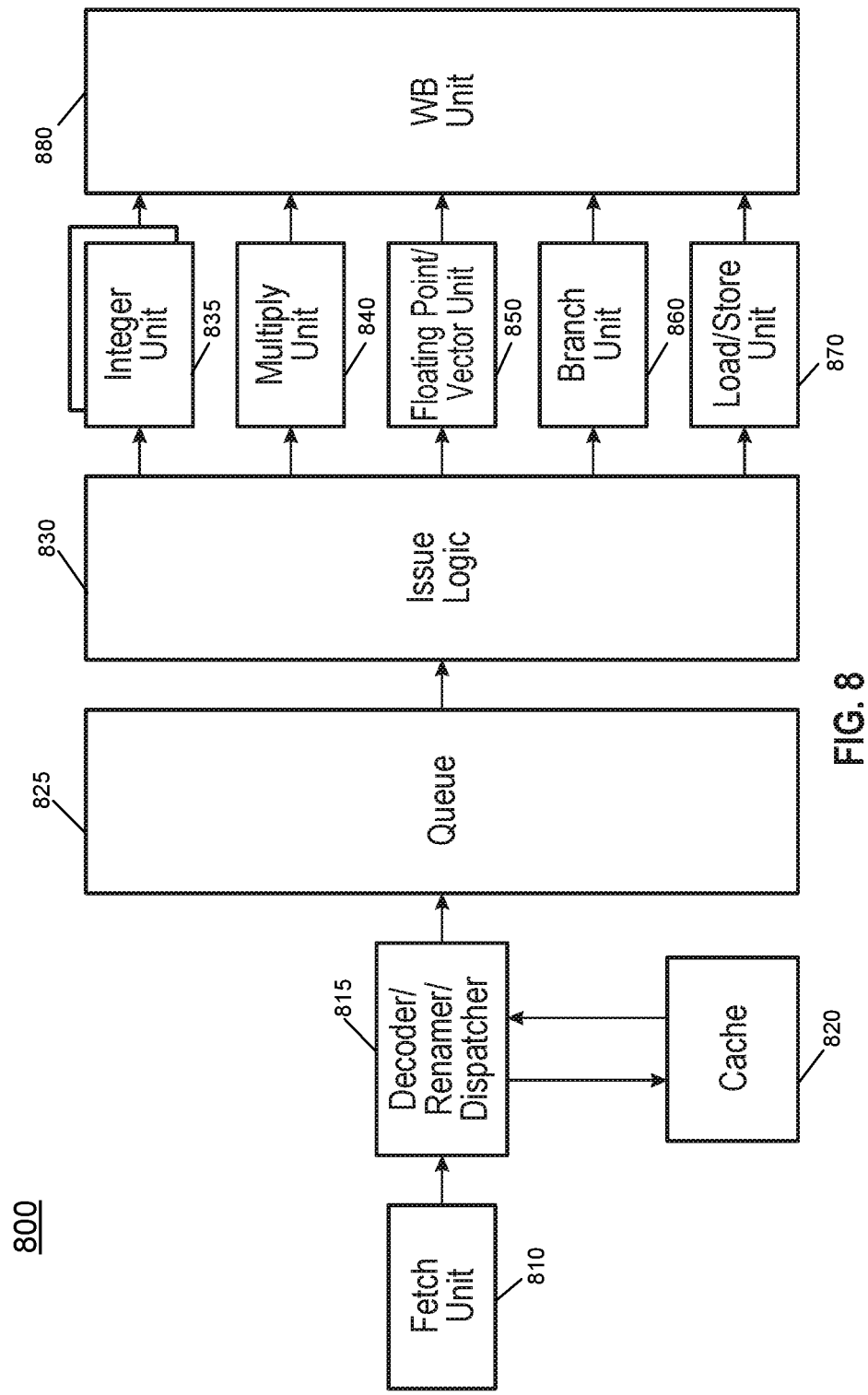
FIG. 8 is a block diagram of a micro-architecture of a processor core in accordance with one or more embodiments.

Referring now to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Although not shown for ease of illustration in FIG. 8, in some embodiments, the core 800 may include some or all of the components and/or functionality described above with reference to FIGS. 1A-1B and 2A-2D (e.g., event counters 134, counter registers 136, check registers 138, and/or ROP detection logic 140).

Figure 9:
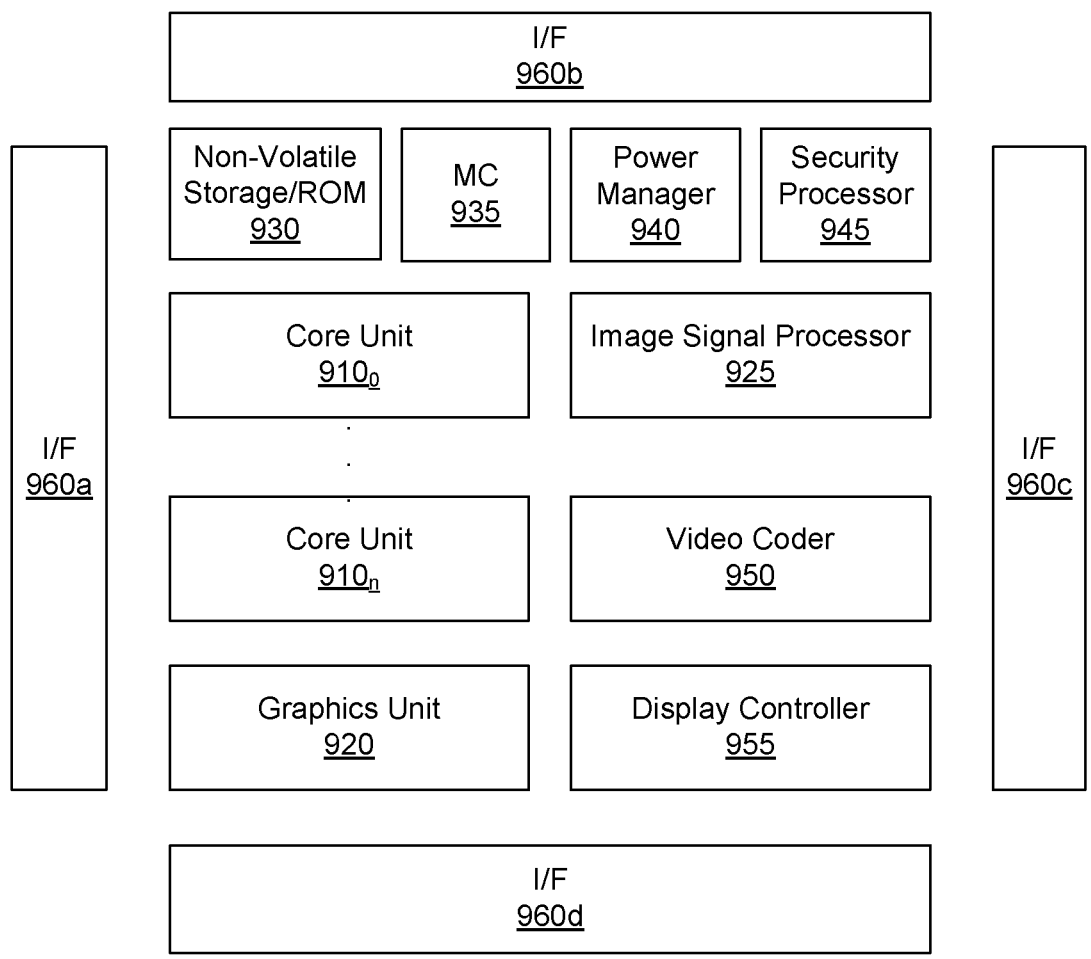
FIG. 9 is a block diagram of a processor in accordance with one or more embodiments.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 9, processor 900 includes a plurality of core units 9100-910*n*. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960*a*-960*d* enable communication with one or more off-chip devices. Such communications may be according to a variety of communication protocols such as PCIe™ GPIO, USB, I2C, UART, MIPI, SDIO, DDR, SPI, HDMI, among other types of communication protocols. Although shown at this high level in the embodiment of FIG. 9, understand the scope of the present invention is not limited in this regard.

Although not shown for ease of illustration in FIG. 9, in some embodiments, the SoC 900 may include some or all of the components and/or functionality described above with reference to FIGS. 1A-1B and 2A-2D (e.g., event counters 134, counter registers 136, check registers 138, and/or ROP detection logic 140).

Figure 10:
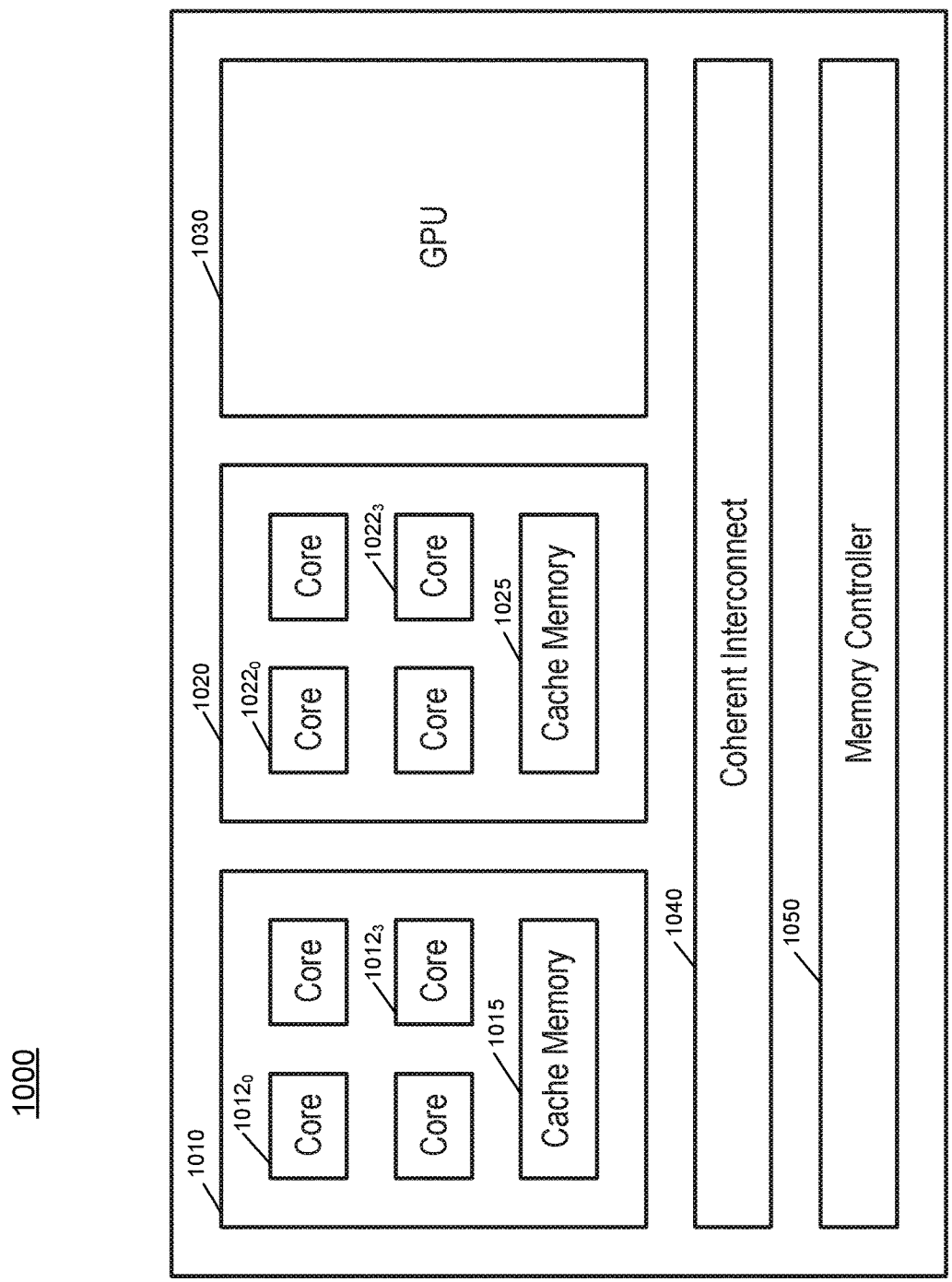
FIG. 10 is a block diagram of a representative SoC in accordance with one or more embodiments.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores 10120-10123. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores 10220-10223. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Although not shown for ease of illustration in FIG. 10, some embodiments, the SoC 1000 may include some or all of the components and/or functionality described above with reference to FIGS. 1A-1B and 2A-2D (e.g., event counters 134, counter registers 136, check registers 138, and/or ROP detection logic 140).

Figure 11:
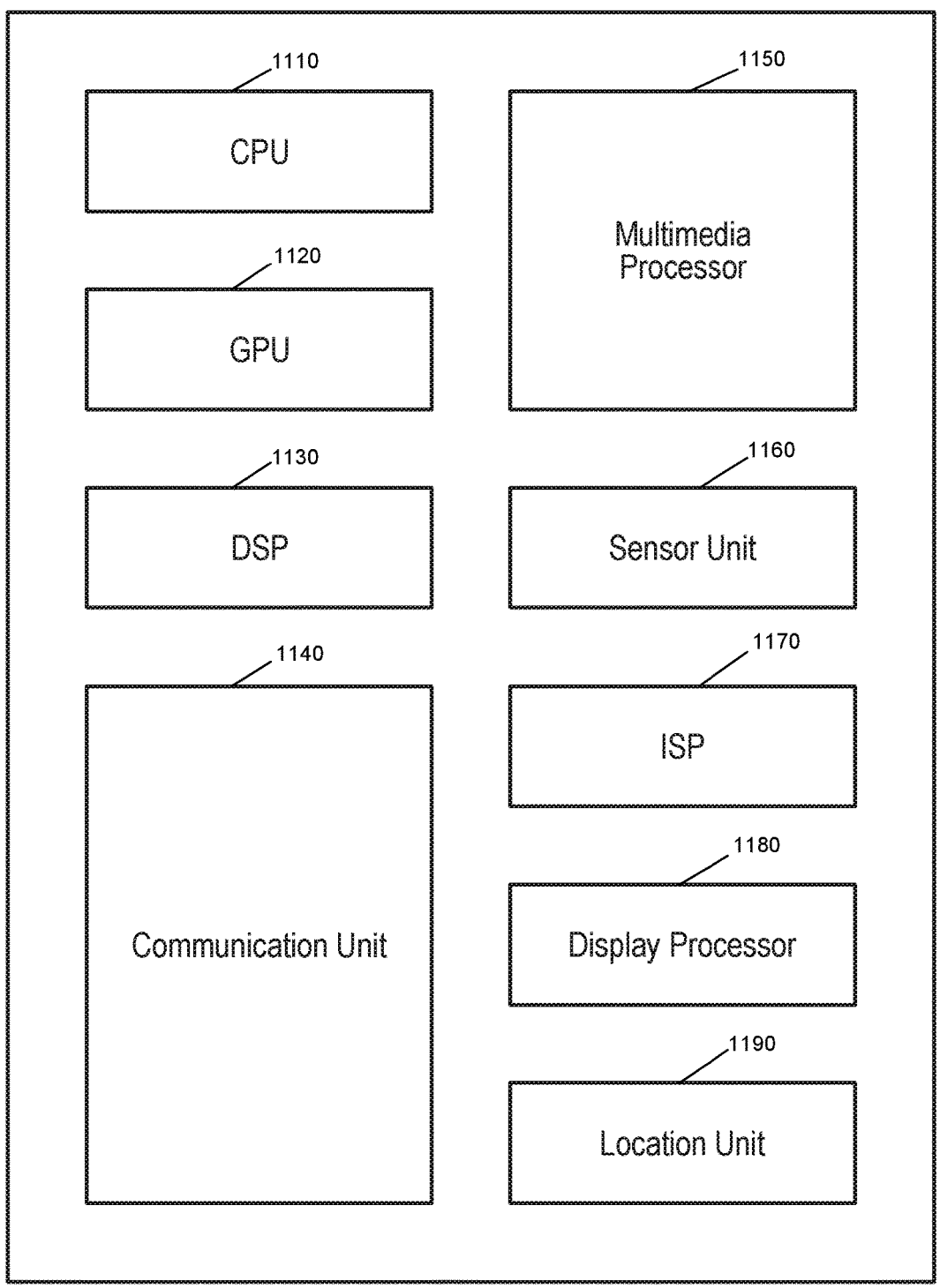
FIG. 11 is a block diagram of another example SoC in accordance with one or more embodiments.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area techniques such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Although not shown for ease of illustration in FIG. 11, in some embodiments, the SoC 1100 may include some or all of the components and/or functionality described above with reference to FIGS. 1A-1B and 2A-2D (e.g., event counters 134, counter registers 136, check registers 138, and/or ROP detection logic 140).

Figure 12:
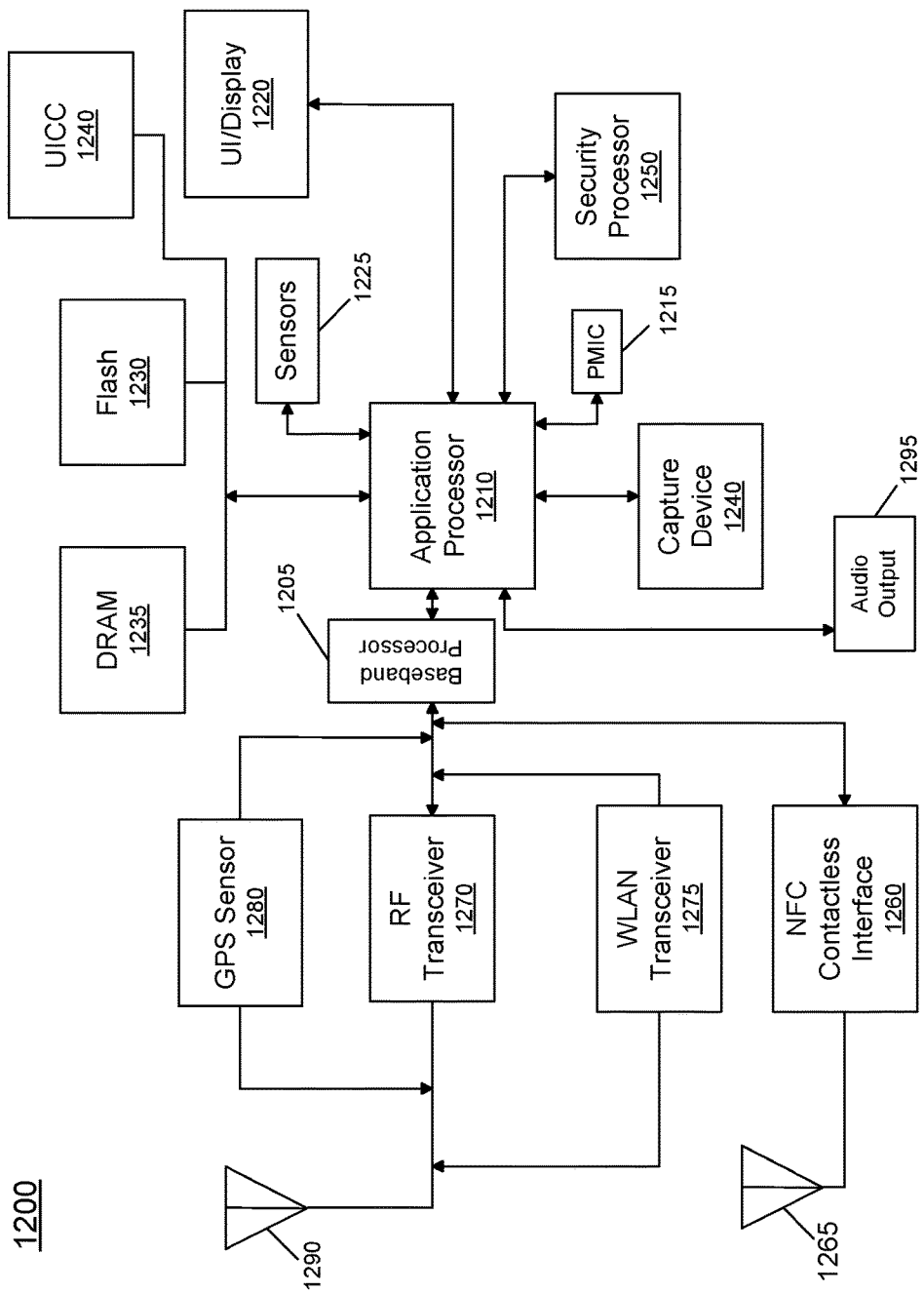
FIG. 12 is a block diagram of an example system with which one or more embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications, such as according to a Bluetooth™ standard or an IEEE 802.11 standard such as IEEE 802.11a/b/g/n can also be realized.

Although not shown for ease of illustration in FIG. 12, in some embodiments, the system 1200 may include some or all of the components and/or functionality described above with reference to FIGS. 1A-1B and 2A-2D (e.g., event counters 134, counter registers 136, check registers 138, and/or ROP detection logic 140).

Figure 13:
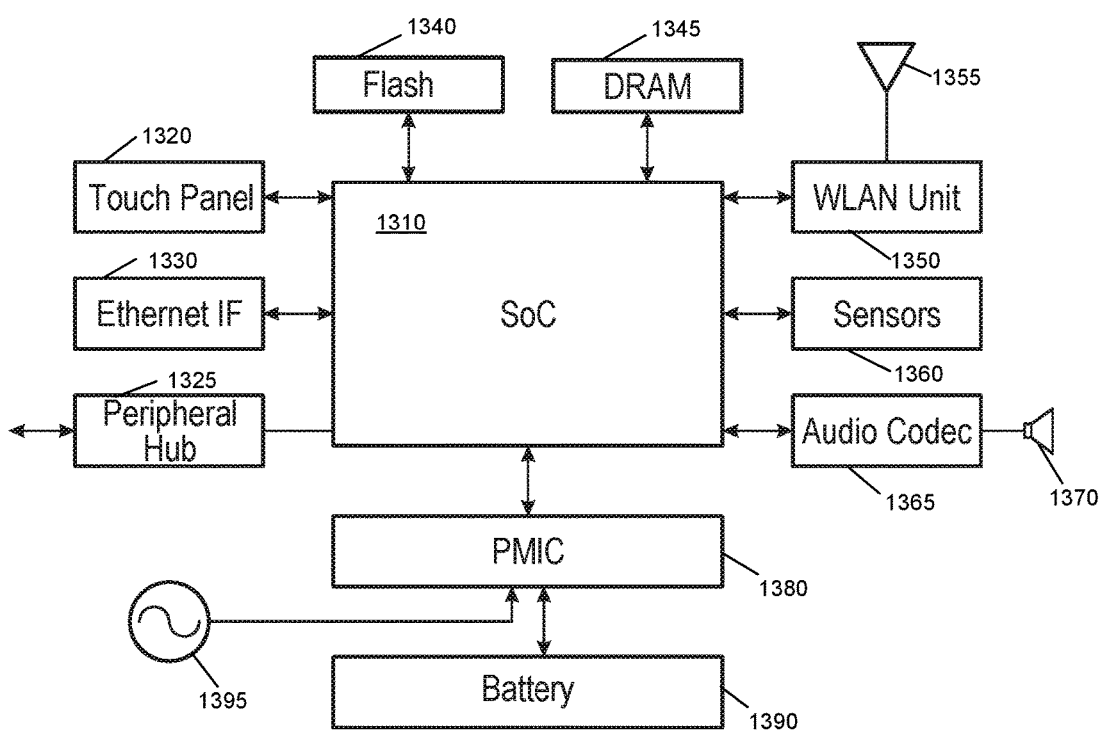
FIG. 13 is a block diagram of another example system with which one or more embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols, including an IEEE 802.11 protocol, a Bluetooth™ protocol or any other wireless protocol.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Although not shown for ease of illustration in FIG. 13, in some embodiments, the system 1300 may include some or all of the components and/or functionality described above with reference to FIGS. 1A-1B and 2A-2D (e.g., event counters 134, counter registers 136, check registers 138, and/or ROP detection logic 140).

Figure 14:
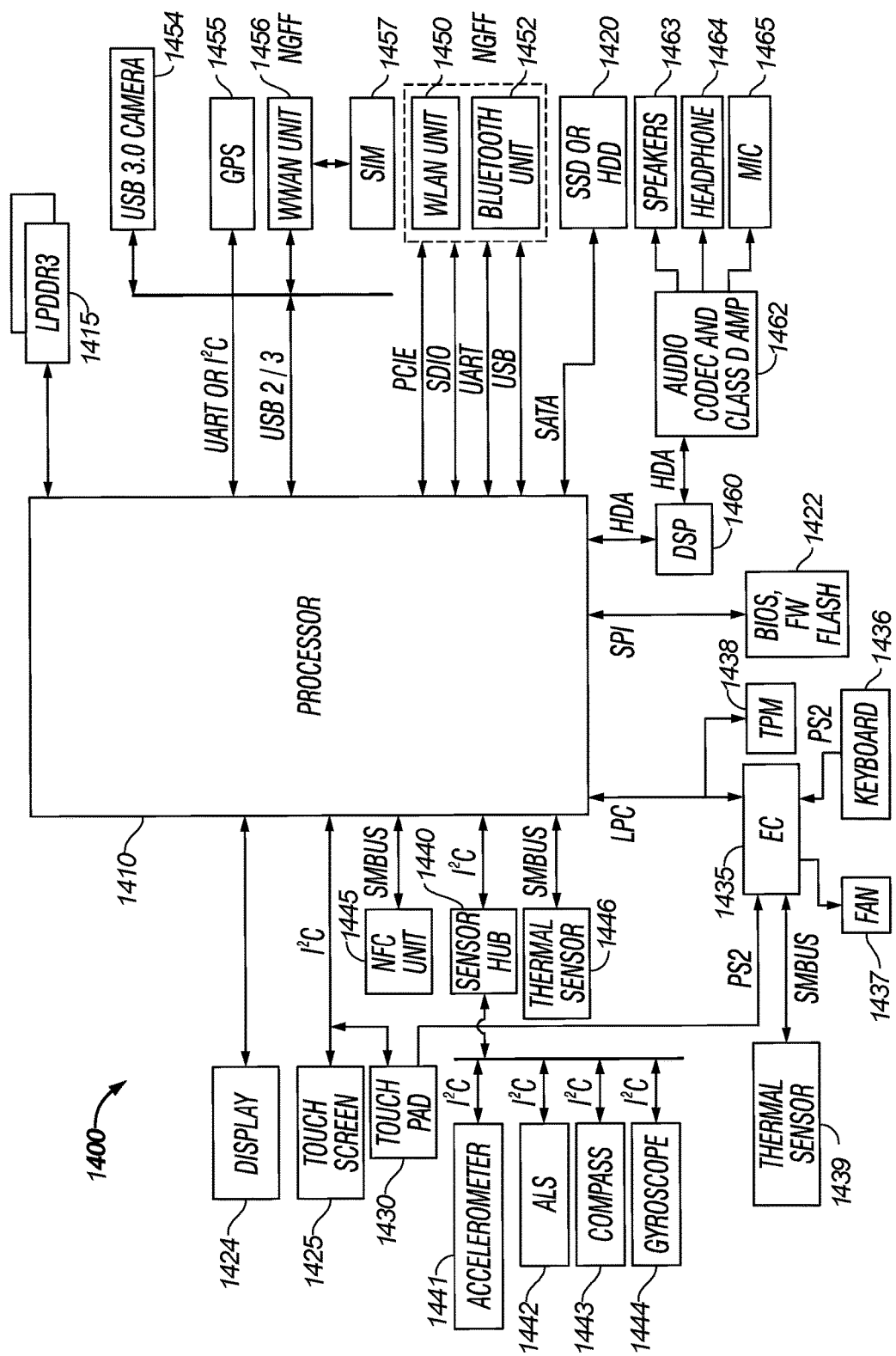
FIG. 14 is a block diagram of a computer system in accordance with one or more embodiments.

Referring now to FIG. 14, a block diagram of a representative computer system 1400 such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1410 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I2C interconnect. As further shown in FIG. 14, in addition to touch screen 1425, user input by way of touch can also occur via a touch pad 1430 which may be configured within the chassis and may also be coupled to the same I2C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I2C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 in accordance with the Trusted Computing Group (TCG) TPM Specification Version 1.2, dated Oct. 2, 2003, may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications in accordance with a given IEEE 802.11 standard can be realized, while via Bluetooth unit 1452, short range communications via a Bluetooth protocol can occur. These units may communicate with processor 1410 via, e.g., a USB link or a universal asynchronous receiver transmitter (UART) link. Or these units may couple to processor 1410 via an interconnect according to a PCIe™ protocol or another such protocol such as a serial data input/output (SDIO) standard.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given USB protocol such as a USB 2.0 or 3.0 link, or a UART or I2C protocol.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Although not shown for ease of illustration in FIG. 14, in some embodiments, the system 1400 may include some or all of the components and/or functionality described above with reference to FIGS. 1A-1B and 2A-2D (e.g., event counters 134, counter registers 136, check registers 138, and/or ROP detection logic 140).

Figure 15:
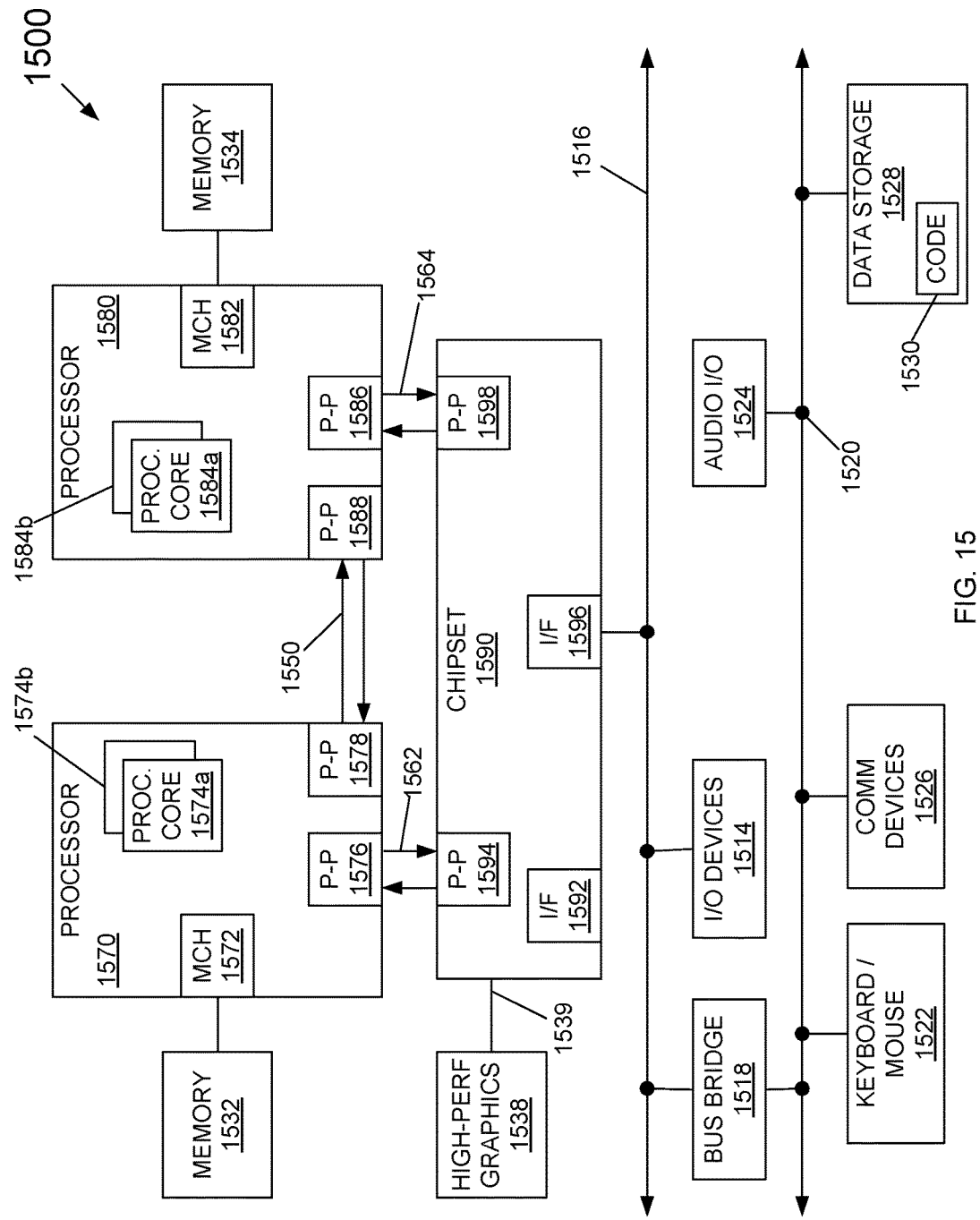
FIG. 15 is a block diagram of a system in accordance with one or more embodiments.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Each of the processors can include a PCU or other power management logic to perform processor-based power management as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface

1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Although not shown for ease of illustration in FIG. 15, in some embodiments, the system 1500 may include some or all of the components and/or functionality described above with reference to FIGS. 1A-1B and 2A-2D (e.g., event counters 134, counter registers 136, check registers 138, and/or ROP detection logic 140).

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following clauses and/or examples pertain to further embodiments.

In one example, a processor for Return Oriented Programming (ROP) detection may include at least one execution unit; a plurality of event counters, each event counter associated with a unique type of a plurality of types of control transfer events; and a ROP detection unit. The ROP detection unit may be to: adjust a first event counter in response to detection of a first type of control transfer events; in response to a determination that the first event counter exceeds a first threshold, access a first configuration register associated with the first event counter to read configuration data; identify a set of ROP heuristic checks based on the configuration data read from the first configuration register; and perform each ROP heuristic check of the identified set of ROP heuristic checks.

In an example, the ROP detection unit is further to: identify a possible ROP attack based on results of performing the identified set of ROP heuristic checks; and provide an indication of a possible ROP attack to an anti-malware application executed by the at least one execution unit of the processor.

In an example, the processor further includes firmware including a plurality of ROP heuristic checks, wherein the identified set of ROP heuristic checks are included in the plurality of ROP heuristic checks.

In an example, the configuration data read from the first configuration register comprises a check bitmap, wherein each bit of the check bitmap indicates whether an associated one of the plurality of ROP heuristic checks is to be performed. In an example, the ROP detection unit is to access a set of heuristic check registers based on the check bitmap, wherein each heuristic check register includes data describing a unique ROP heuristic check. In an example, the configuration data read from the first configuration register further comprises: an enable bit indicating whether the first event counter is active; and a threshold field storing the first threshold set for the first event counter.

In an example, the identified set of ROP heuristic checks comprises a check to determine whether a stack pointer is within valid boundaries of a stack region.

In an example, the identified set of ROP heuristic checks comprises a check to determine whether an instruction pointer is within a set of valid memory address ranges for the instruction pointer.

In an example, the identified set of ROP heuristic checks comprises a check to determine whether an instruction pointer is pointing to a valid Application Programming Interface (API) function.

In one example, a machine-readable medium has stored thereon data, which if used by at least one machine, causes the at least one machine to fabricate at least one integrated circuit to perform a method for Return Oriented Programming (ROP) detection. The method comprises: adjusting, by a ROP detection unit, a plurality of event counters of a processor based on detections of control transfer events; in response to a determination that a first event counter exceeds a first threshold, accessing a first configuration register uniquely associated with the first event counter, wherein the first configuration register is included in the processor; reading, from the first configuration register, a check bitmap for the first event counter; accessing, by the ROP detection unit, a plurality of check registers of the processor based on the check bitmap, wherein each one of the plurality of check registers uniquely identifies one of a plurality of ROP heuristic checks; performing each identified one of the plurality of ROP heuristic checks; and determining whether a possible ROP attack is occurring based on results of performing each identified one of the plurality of ROP heuristic checks.

In an example, the method further comprises providing, by the ROP detection unit, an indication of a possible ROP attack to an anti-malware application.

In an example, performing each identified one of the plurality of ROP heuristic checks comprises determining whether a stack pointer is within valid boundaries of a stack region.

In an example, performing each identified one of the plurality of ROP heuristic checks comprises determining whether an instruction pointer is within a set of valid memory address ranges for the instruction pointer.

In an example, performing each identified one of the plurality of ROP heuristic checks comprises determining whether an instruction pointer is pointing to a valid Application Programming Interface (API) function.

In an example, the method further comprises reading, from the first configuration register: an enable bit indicating whether the first event counter is active; and a threshold value for the first event counter.

In one example, a system for Return Oriented Programming (ROP) detection comprises a processor including a plurality of cores, and a system memory coupled to the processor. Each core may include: a plurality of event counters; a plurality of configuration registers; a plurality of check registers; and a ROP detection unit. The ROP detection unit may be to: adjust a first event counter in response to detection of control transfer events; upon reaching a first threshold of the first event counter, access a first configuration register; read, from the first configuration register, configuration data for the first event counter; determine a set of ROP heuristic checks based on the configuration data read from the first configuration register; and identify a possible ROP attack based on results of the set of ROP heuristic checks.

In an example, the set of ROP heuristic checks comprises a check to determine whether a stack pointer is within valid boundaries of a stack region.

In an example, the set of ROP heuristic checks comprises a check to determine whether an instruction pointer is within a set of valid memory address ranges for the instruction pointer.

In an example, the ROP detection unit is further to provide an indication of a possible ROP attack to an anti-malware application.

In an example, the configuration data read from the first configuration register comprises a check bitmap, wherein the check bitmap comprises bits associated with the set of ROP heuristic checks.

In one example, a method for Return Oriented Programming (ROP) detection includes: adjusting, by a ROP detection unit, a plurality of event counters of a processor based on detections of control transfer events; in response to a determination that a first event counter exceeds a first threshold, accessing a first configuration register uniquely associated with the first event counter, wherein the first configuration register is included in the processor; reading, from the first configuration register, a check bitmap for the first event counter; accessing, by the ROP detection unit, a plurality of check registers of the processor based on the check bitmap, wherein each one of the plurality of check registers uniquely identifies one of a plurality of ROP heuristic checks; performing each identified one of the plurality of ROP heuristic checks; and determining whether a possible ROP attack is occurring based on results of performing each identified one of the plurality of ROP heuristic checks.

In an example, the method further includes providing, by the ROP detection unit, an indication of a possible ROP attack to an anti-malware application.

In an example, performing each identified one of the plurality of ROP heuristic checks comprises determining whether a stack pointer is within valid boundaries of a stack region.

In an example, the method further includes performing each identified one of the plurality of ROP heuristic checks comprises determining whether an instruction pointer is within a set of valid memory address ranges for the instruction pointer.

In an example, the method performing each identified one of the plurality of ROP heuristic checks comprises determining whether an instruction pointer is pointing to a valid Application Programming Interface (API) function.

In an example, the method further includes reading, from the first configuration register: an enable bit indicating whether the first event counter is active; and a threshold value for the first event counter.

In an example, a machine readable medium has stored thereon data, which if used by at least one machine, causes the at least one machine to fabricate at least one integrated circuit to perform a method according to any one of the above examples.

In an example, an apparatus for processing instructions, is configured to perform the method of any one of the above examples.

In one example, an apparatus for Return Oriented Programming (ROP) detection comprises: means for adjusting a plurality of event counters of a processor based on detections of control transfer events; means for, in response to a determination that a first event counter exceeds a first threshold, accessing a first configuration register uniquely associated with the first event counter, wherein the first configuration register is included in the processor; means for reading, from the first configuration register, a check bitmap for the first event counter; means for accessing a plurality of check registers of the processor based on the check bitmap, wherein each one of the plurality of check registers uniquely identifies one of a plurality of ROP heuristic checks; means for performing each identified one of the plurality of ROP heuristic checks; and means for determining whether a possible ROP attack is occurring based on results of performing each identified one of the plurality of ROP heuristic checks.

In an example, the apparatus further comprises means for providing an indication of a possible ROP attack to an anti-malware application.

In an example, the means for performing each identified one of the plurality of ROP heuristic checks comprises means for determining whether a stack pointer is within valid boundaries of a stack region.

In an example, the means for performing each identified one of the plurality of ROP heuristic checks comprises means for determining whether an instruction pointer is within a set of valid memory address ranges for the instruction pointer.

In an example, the means for performing each identified one of the plurality of ROP heuristic checks comprises means for determining whether an instruction pointer is pointing to a valid Application Programming Interface (API) function.

In an example, the apparatus further comprises means for reading, from the first configuration register: an enable bit indicating whether the first event counter is active; and a threshold value for the first event counter.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments for the sake of illustration, those skilled in the art will appreciate numerous modifications and variations therefrom. It is intended that the appended claims cover all such modifications and variations as fall within the true spirit and scope of this present invention.

What is claimed is:

1. A machine-readable device comprising data, the data, when used by at least one machine, to cause the at least one machine to fabricate at least one integrated circuit that is to at least:

adjust respective ones of a plurality of event counters of a processor based on respective types of detected control transfer events, respective ones of the events counters associated with respective ones of a plurality of configuration registers, and respective ones of the configuration registers to store data identifying respective ones of a plurality of sets of heuristic checks, a first one of the sets of heuristic checks different from a second one of the sets of heuristic checks;

in response to a determination that a first one of the event counters satisfies a first threshold, access a first one of the configuration registers, the first one of the configuration registers associated with the first one of the event counters, and the first one of the configuration registers included in the processor;

read, from the first one of the configuration registers, a first check bitmap for the first event counter, the first check bitmap to identify a first plurality of check registers, wherein respective bits of the check bitmap are associated with respective check registers including the first plurality of check registers, and respective settings of the respective bits are included in the check bitmap to identify the first plurality of check registers;

access the first plurality of check registers based on the first check bitmap, respective ones of the first plurality of check registers to store data corresponding to respective ones of the heuristic checks included in the first one of the sets of heuristic checks, and the respective ones of the heuristics checks corresponding to respective, different types of heuristic checks;

perform the heuristic checks included in the first one of the sets of heuristic checks;

determine whether a possible ROP attack is occurring based on results of performing the heuristic checks included in the first one of the sets of heuristic checks; and provide an indication of a possible ROP attack to an anti-malware software application that is to perform an action responsive to identification of the ROP attack, the action to include at least one of monitoring suspected code, quarantining suspected code, notifying at least one of an administrator or a management system, halting execution of a system, or shutting down the system.

2. The machine-readable device of claim 1, wherein one of the heuristic checks included in the first one of the sets of heuristic checks includes determining whether a stack pointer is within valid boundaries of a stack region.

3. The machine-readable device of claim 1, wherein one of the heuristic checks included in the first one of the sets of heuristic checks includes determining whether an instruction pointer is within a set of valid memory address ranges for the instruction pointer.

4. The machine-readable device of claim 1, wherein one of the heuristic checks included in the first one of the sets of heuristic checks includes determining whether an instruction pointer is pointing to a valid Application Programming Interface (API) function.

5. The machine-readable device of claim 1, wherein the at least one integrated circuit is to read, from the first one of the configuration registers:
an enable bit indicating whether the first one of the event counters is active; and
a threshold value for the first one of the event counters.

6. A processor comprising:
at least one execution unit, the at least one execution unit associated with an operating system;
a plurality of event counters, respective ones of the event counters to count respective types of control transfer events;
a plurality of configuration registers, respective ones of the configuration registers to store configuration data for the respective ones of the event counters, a first one of the configuration registers associated with a first one of the event counters to store first configuration data to identify first heuristic checks, a second one of the configuration registers associated with a second one of the event counters to store second configuration data to identify second heuristic checks, the first heuristic checks different than the second heuristic checks; and
a Return Oriented Programming (ROP) detection unit to:
adjust a first one of the event counters in response to detection of a first type of the control transfer events; and
in response to a determination that the first one of the event counters satisfies a first threshold:
read the first configuration data stored in the first one of the configuration registers to identify the first heuristic checks, wherein the first configuration data stored in the first configuration register includes a check bitmap, respective bits of the check bitmap are associated with respective ones of a plurality of heuristic checks, the plurality of the heuristic checks include the first heuristic checks and the second heuristic checks, and respective settings of the respective bits are included in the check bitmap to identify the first heuristic checks;
access a first set of heuristic check registers based on the check bitmap, respective ones of the first set of heuristic check registers to store data corresponding to respective types of heuristic checks;
perform the first heuristic checks;
identify a possible ROP attack based on results of performing the first heuristic checks; and
provide an indication of the possible ROP attack to the execution unit, the execution unit to cause at least one of the operating system or protection software to take an action responsive to identification of the possible ROP attack, the action to include at least one of monitoring suspected code, quarantining suspected code, notifying at least one of an administrator or a management system, halting execution of a system, or shutting down the system.

7. The processor of claim 6, further including firmware, and the ROP detection unit to perform the first heuristic checks by triggering one or more functions of the firmware.

8. The processor of claim 6, wherein the first configuration data read from the first one of the configuration registers further includes:
an enable bit to indicate whether the first one of the event counters is active; and
a threshold field to store the first threshold for the first one of the event counters.

9. The processor of claim 6, further including a stack, the first heuristic checks including a boundary check to determine whether a stack pointer of the stack is within a set of valid boundaries of a region of the stack.

10. The processor of claim 6, further including memory to store instructions, the first heuristic checks including a range check to determine whether an instruction pointer is within a set of valid memory address ranges of the memory.

11. The processor of claim 6, wherein the first heuristic checks a include an Application Programming Interface (API) check to determine whether an instruction pointer associated with an instruction stack is pointing to a valid API function.

12. A system comprising:
a processor including a plurality of cores, a first one of the cores including:
a plurality of event counters, respective ones of the event counters to count respective types of control transfer events;

a plurality of configuration registers, respective ones of the configuration registers to store configuration data for the respective ones of the event counters, a first one of the configuration registers associated with a first one of the event counters to store first configuration data to identify first heuristic checks, a second one of the configuration registers associated with a second one of the event counters to store second configuration data to identify second heuristic checks, the first heuristic checks different than the second heuristic checks;

a plurality of check registers, respective ones of the check registers to store data associated with respective ones of a plurality of heuristic checks, the plurality of heuristic checks including the first heuristic checks and the second heuristic checks; and a Return Oriented Programming (ROP) detection unit to:

adjust the first one of the event counters in response to detection of a first one of the types of control transfer events; and when the first one of the event counters satisfies a first threshold:

access the first one of the configuration registers;

read, from the first one of the configuration registers, the first configuration data for the first one of the event counters, wherein the first configuration data stored in the first configuration register includes a check bitmap, respective bits of the check bitmap are associated with respective ones of the heuristic check registers, and respective settings of the respective bits are included in the check bitmap to identify the first heuristic checks;

access a first set of heuristic check registers based on the check bitmap to identify the first heuristic checks based on the first configuration data read from the first configuration register;

identify a possible ROP attack based on results of the first heuristic checks; and cause an anti-malware application to perform an action responsive to identification of the possible ROP attack, the action to include at least one of monitoring suspected code, quarantining suspected code, notifying at least one of an administrator or a management system, halting execution of a system, or shutting down the system; and memory coupled to the processor.

13. The system of claim 12, wherein the plurality of heuristic checks includes a first check to determine whether a stack pointer is within valid boundaries of a stack region.

14. The system of claim 12, wherein the plurality of heuristic checks includes a first check to determine whether an instruction pointer is within a set of valid memory address ranges for the instruction pointer.

15. The system of claim 12, wherein the bits of the check bitmap associated with the first heuristic checks are set differently than the bits of the check bitmap not associated with the first heuristic checks.

* * * * *